US012524916B2

(12) United States Patent
Park et al.

(10) Patent No.: US 12,524,916 B2
(45) Date of Patent: Jan. 13, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventors: Yousun Park, Seoul (KR); Sejin Oh, Seoul (KR); Hyejung Hur, Seoul (KR)

(73) Assignee: LG Electronics Inc., Seoul (KR)

( * ) Notice: Subject to any disclaimer, the term of this patent is extended or adjusted under 35 U.S.C. 154(b) by 496 days.

(21) Appl. No.: 17/772,415

(22) PCT Filed: Aug. 24, 2020

(86) PCT No.: PCT/KR2020/011254
§ 371 (c)(1),
(2) Date: Apr. 27, 2022

(87) PCT Pub. No.: WO2021/132834
PCT Pub. Date: Jul. 1, 2021

(65) Prior Publication Data
US 2022/0383553 A1    Dec. 1, 2022

Related U.S. Application Data

(60) Provisional application No. 62/953,884, filed on Dec. 26, 2019.

(51) Int. Cl.
*G06T 9/00*    (2006.01)
*G06F 7/24*    (2006.01)

(52) U.S. Cl.
CPC .............. *G06T 9/001* (2013.01); *G06F 7/24* (2013.01)

(58) Field of Classification Search
None
See application file for complete search history.

(56) References Cited

U.S. PATENT DOCUMENTS

2012/0313944 A1    12/2012    Kontkanen et al.
2017/0200303 A1*   7/2017     Havran .................. G06T 17/10
(Continued)

FOREIGN PATENT DOCUMENTS

CA        3096452        10/2019
CN        109544681 A    3/2019
(Continued)

OTHER PUBLICATIONS

Kim et al ("Efficient encoding and decoding extended geocodes for massive point cloud data." 2019 IEEE International Conference on Big Data and Smart Computing (BigComp). IEEE, Apr. 4, 2019, pp. 1-8, retrieved from the Internet on Aug. 3, 2024) (Year: 2019).*

(Continued)

*Primary Examiner* — Leon Viet Q Nguyen
(74) *Attorney, Agent, or Firm* — Fish & Richardson P.C.

(57) ABSTRACT

A point cloud data transmission method according to embodiments may comprise the steps of: encoding point cloud data; and transmitting a bitstream comprising the point cloud data. A point cloud data reception method according to embodiments may comprise the steps of: receiving a bitstream comprising point cloud data; and decoding the point cloud data.

16 Claims, 26 Drawing Sheets

(56) References Cited

U.S. PATENT DOCUMENTS

| | | | |
|---|---|---|---|
| 2017/0347120 A1 | 11/2017 | Chou et al. | |
| 2018/0130249 A1 | 5/2018 | Shin et al. | |
| 2019/0081638 A1* | 3/2019 | Mammou | H04N 19/436 |
| 2019/0087978 A1 | 3/2019 | Tourapis et al. | |
| 2020/0219288 A1* | 7/2020 | Joshi | G06T 9/40 |
| 2022/0207781 A1* | 6/2022 | Zhang | H04N 19/85 |

FOREIGN PATENT DOCUMENTS

| | | |
|---|---|---|
| CN | 109993839 A | 7/2019 |
| KR | 20140056290 | 5/2014 |
| KR | 20150067265 | 6/2015 |
| KR | 101723823 | 4/2017 |
| WO | WO 2019/198636 A1 | 5/2021 |

OTHER PUBLICATIONS

Kim et al ("Efficient encoding and decoding extended geocodes for massive point cloud data." 2019 IEEE International Conference on Big Data and Smart Computing (BigComp). IEEE, Apr. 4, 2019, pp. 1-8) (Year: 2019).*

Office Action in Indian Appln. No. 202217029800, dated Sep. 28, 2022, 6 pages.

International Search Report and Written Opinion in International Appln. No. PCT/KR2020/011254, dated Dec. 2, 2020, 17 pages (with English translation).

Mammou et al., "G-PCC codec description v2," ISO/IEC JTC1/SC29/WG11, N18189, Marrakech, MA, Jan. 2019, 39 pages.

Office Action in Japanese Appln. No. 2022-525017, mailed on Aug. 27, 2024, 8 pages (English translation).

Vinkler et al., "Extended Morton Codes for High Performance Bounding vol. Hierarchy Construction," Hpg, Acm, Jun. 2017, 8 pages.

Office Action in Chinese Appln. No. 202080078940.6, mailed on Jan. 17, 2025, 18 pages (with English translation).

Zhao et al., "Data compression and spatial indexing technology for massive 3D point cloud," Journal of Computer Applications, Jan. 2018, 38(1):146-151, 193 (with English abstract).

\* cited by examiner

FIG. 6
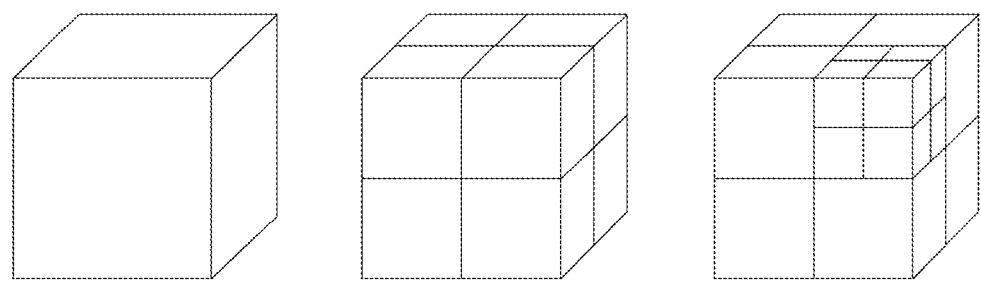
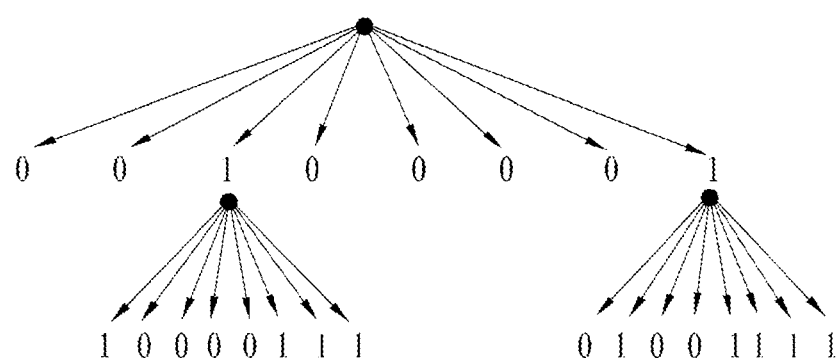

FIG. 7
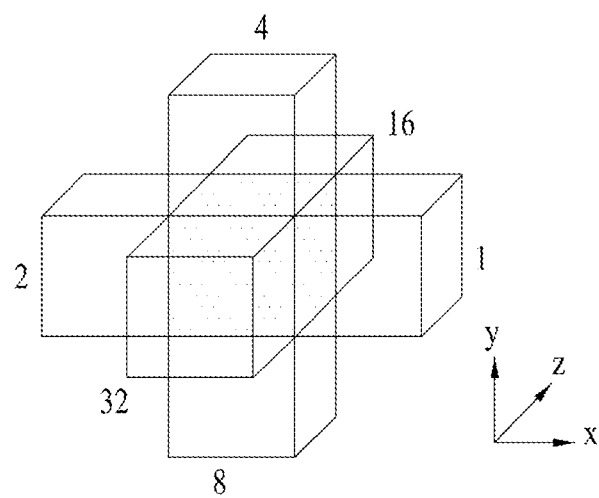
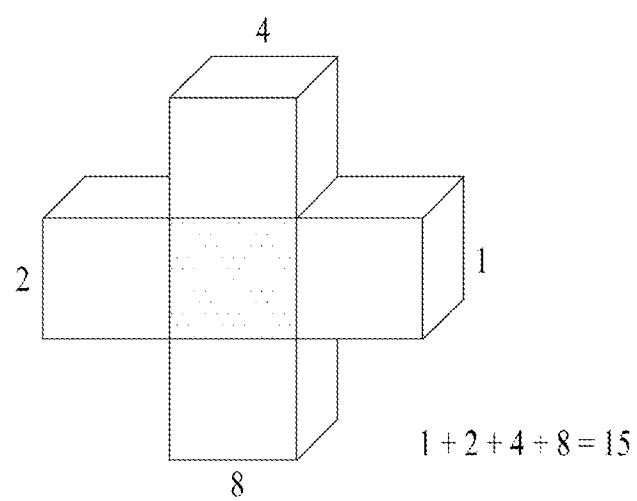
1 + 2 + 4 + 8 = 15

FIG. 16

| S16000 | Morton code generation according to axis |
|---|---|
| S16000 | Morton code generation according to density |
| S16000 | Threshold of Morton code generation order |

FIG. 18

```
inline void
computeAxisOrder()
{
  auto bbox = pointCloud.computeBoundingBox();
  for (int i = 0; i < 3; i++) {
    axisInfo[i].length = bbox.max[i] - bbox.min[i];
    axisInfo[i].order = i;
  }
  sort(axisInfo.begin(), axisInfo.end());
  double minMaxAxisRatio = double(axisInfo[2].length) / double(axisInfo[0].length);
  if (minMaxAxisRatio < 5.0) {
    axisInfo[0].order = 0;
    axisInfo[1].order = 1;
    axisInfo[2].order = 2;
  }
}
```

| tile_parameter_set( ) { | Descriptor |
|---|---|
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| tile_bounding_box_offset_z[ i ] | se(v) |
| tile_bounding_box_scale_factor[ i ] | ue(v) |
| tile_bounding_box_size_width[ i ] | ue(v) |
| tile_bounding_box_size_height[ i ] | ue(v) |
| } | |
| axis_condition_selection | ue(v) |
| ascending_order_flag | u(1) |
| axis_ordering_threshold | ue(v) |
| } | |

FIG. 22

| geometry_parameter_set( ) { | Descriptor |
|---|---|
| gps_geom_parameter_set_id | ue(v) |
| gps_seq_parameter_set_id | ue(v) |
| gps_box_present_flag | u(1) |
| unique_geometry_points_flag | u(1) |
| neighbour_context_restriction_flag | u(1) |
| inferred_direct_coding_mode_enabled_flag | u(1) |
| bitwise_occupancy_coding_flag | u(1) |
| child_neighbours_enabled_flag | u(1) |
| geom_occupancy_ctx_reduction_factor | ue(v) |
| log2_neighbour_avail_boundary | ue(v) |
| log2_intra_pred_max_node_size | ue(v) |
| log2_trisoup_node_size | ue(v) |
| axis_condition_selection | ue(v) |
| ascending_order_flag | u(1) |
| axis_ordering_threshold | ue(v) |
| gps_extension_present_flag | u(1) |
| if( gps_extension_present_flag ) | |
|     while( more_data_in_byte_stream( ) ) | |
|         gps_extension_data_flag | u(1) |
| byte_alignment( ) | |
| } | |

FIG. 23

| attribute_parameter_set( ) { | Descriptor |
|---|---|
|    aps_attr_parameter_set_id | ue(v) |
|    aps_seq_parameter_set_id | ue(v) |
|    attr_coding_type | ue(v) |
|    isLifting = ( attr_coding_type == 0 \|\| attr_coding_type == 2 ) ? 1 : 0 | |
|    if( isLifting ) { | |
|       num_pred_nearest_neighbours | ue(v) |
|       max_num_direct_predictors | ue(v) |
|       lifting_search_range | ue(v) |
|       lifting_quant_step_size | ue(v) |
|       lifting_quant_step_size_chroma | ue(v) |
|       lod_binary_tree_enabled_flag | u(1) |
|       num_detail_levels_minus1 | ue(v) |
|       for( idx = 0; idx <= num_detail_levels_minus1; idx++ ) { | |
|          sampling_distance_squared[ idx ] | ue(v) |
|       } | |
|    axis_condition_selection | ue(v) |
|    ascending_order_flag | u(1) |
|    axis_ordering_threshold | ue(v) |
|    if( attr_coding_type == 0 ) //PredictingLifting | |
|       adaptive_prediction_threshold | ue(v) |
|    } | |
|    if( attribute_coding_type == 1 ) { //RAHT | |
|       raht_depth | ue(v) |
|       raht_quant_step_size | ue(v) |
|       raht_quant_step_size_chroma | ue(v) |
|    } | |
|    aps_extension_present_flag | u(1) |
|    if( aps_extension_present_flag ) | |
|       while( more_data_in_byte_stream( ) ) | |
|          aps_extension_data_flag | u(1) |
|    byte_alignment( ) | |
| } | |

FIG. 24

| geometry_slice_header( ) { | Descriptor |
|---|---|
|     gsh_geometry_parameter_set_id | ue(v) |
|     gsh_tile_id | ue(v) |
|     gsh_slice_id | ue(v) |
|     if( gps_box_present_flag ) { | |
|         gsh_box_log2_scale | ue(v) |
|         gsh_box_origin_x | ue(v) |
|         gsh_box_origin_y | ue(v) |
|         gsh_box_origin_z | ue(v) |
|     } | |
|     gsh_log2_max_nodesize | ue(v) |
|     gsh_points_number | ue(v) |
|     axis_condition_selection | ue(v) |
|     ascending_order_flag | u(1) |
|     axis_ordering_threshold | ue(v) |
|     byte_alignment( ) | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a National Stage application under 35 U.S.C. § 371 of International Application No. PCT/KR2020/011254, filed on Aug. 24, 2020, which claims the benefit of U.S. Provisional Application No. 62/953,884, filed on Dec. 26, 2019. The disclosures of the prior applications are incorporated by reference in their entirety.

TECHNICAL FIELD

Embodiments relate to a method and apparatus for processing point cloud content.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide an apparatus and method for efficiently processing point cloud data. Embodiments provide a point cloud data processing method and apparatus for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

To achieve these objects and other advantages and in accordance with the purpose of the disclosure, as embodied and broadly described herein, a method for transmitting point cloud data may include encoding point cloud data, and transmitting a bitstream containing the point cloud data.

In another aspect of the present disclosure, a method for receiving point cloud data may include receiving a bitstream including point cloud data, and decoding the point cloud data.

Advantageous Effects

Apparatuses and methods according to embodiments may process point cloud data with high efficiency.

The apparatuses and methods according to the embodiments may provide a high-quality point cloud service.

The apparatuses and methods according to the embodiments may provide point cloud content for providing general-purpose services such as a VR service and a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 6 shows an example of an octree and occupancy code according to embodiments;

FIG. 7 shows an example of a neighbor node pattern according to embodiments;

FIG. 16 illustrates a method for generating a Morton code according to embodiments;

FIG. 18 shows a threshold of the Morton code generation order according to the embodiments;

FIG. 21 shows a tile parameter set (TPS) according to embodiments;

FIG. 22 shows a geometry parameter set (GPS) according to embodiments;

FIG. 23 shows an attribute parameter set (APS) according to embodiments;

FIG. 24 shows a geometry slice header (GSH) according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
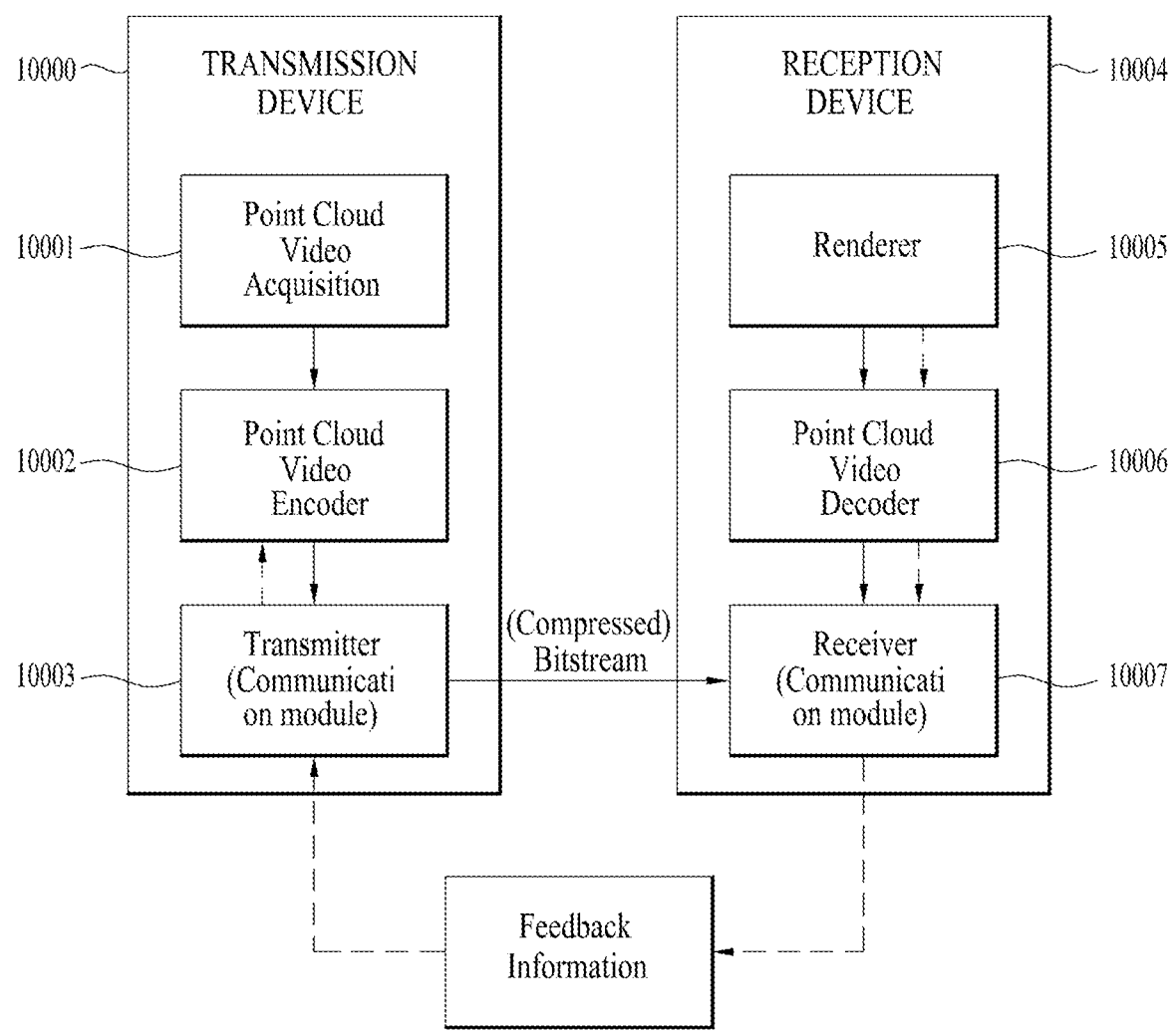
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
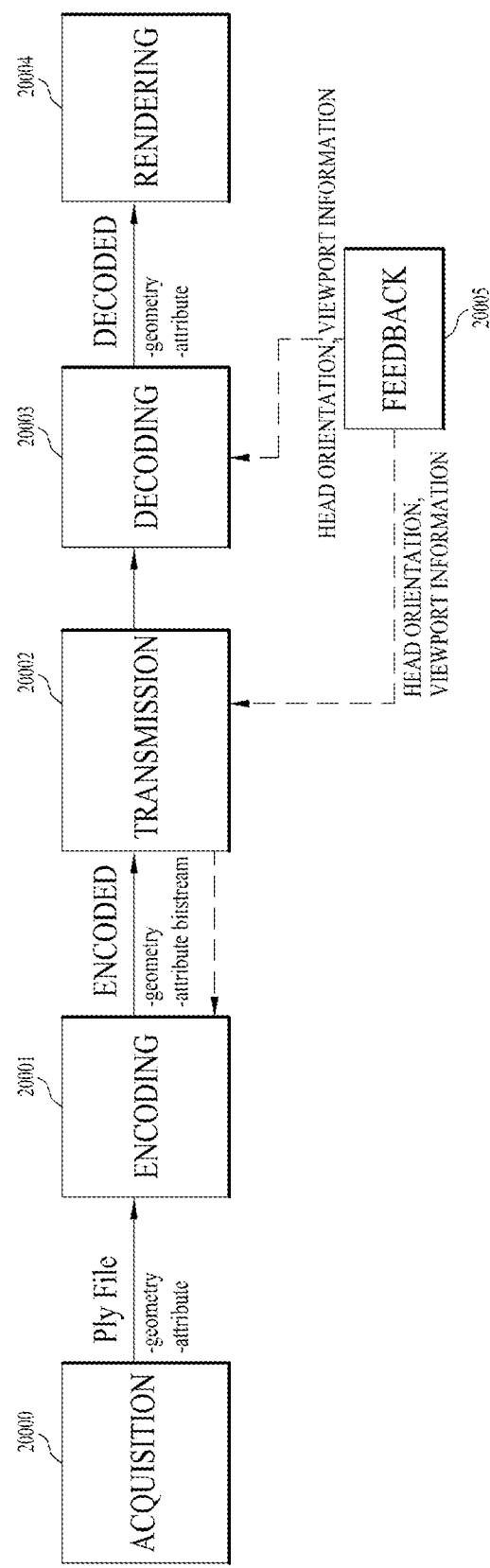
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream.

According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
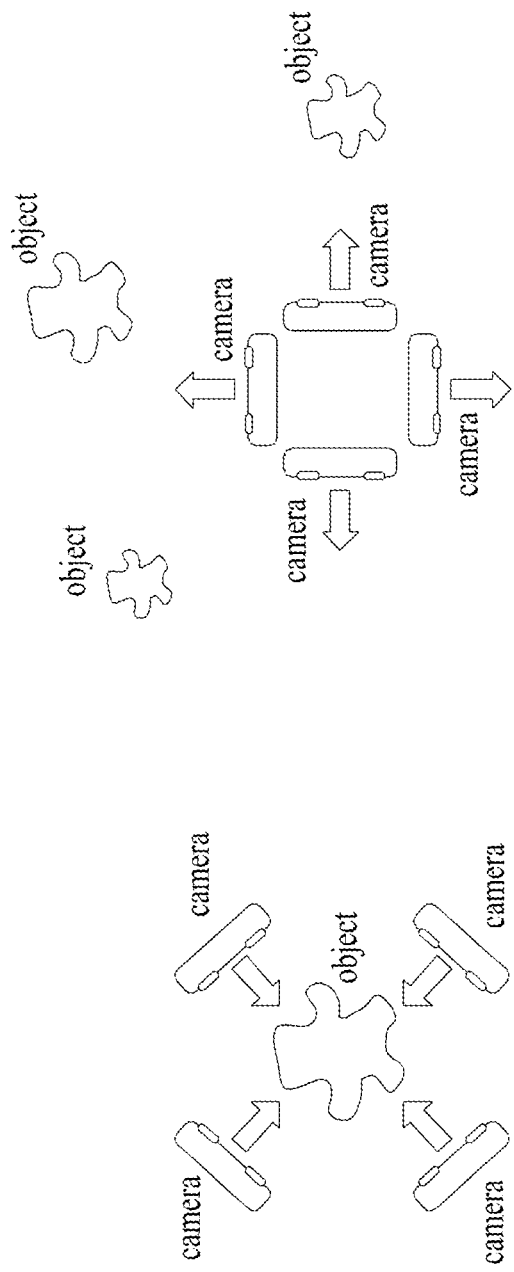
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
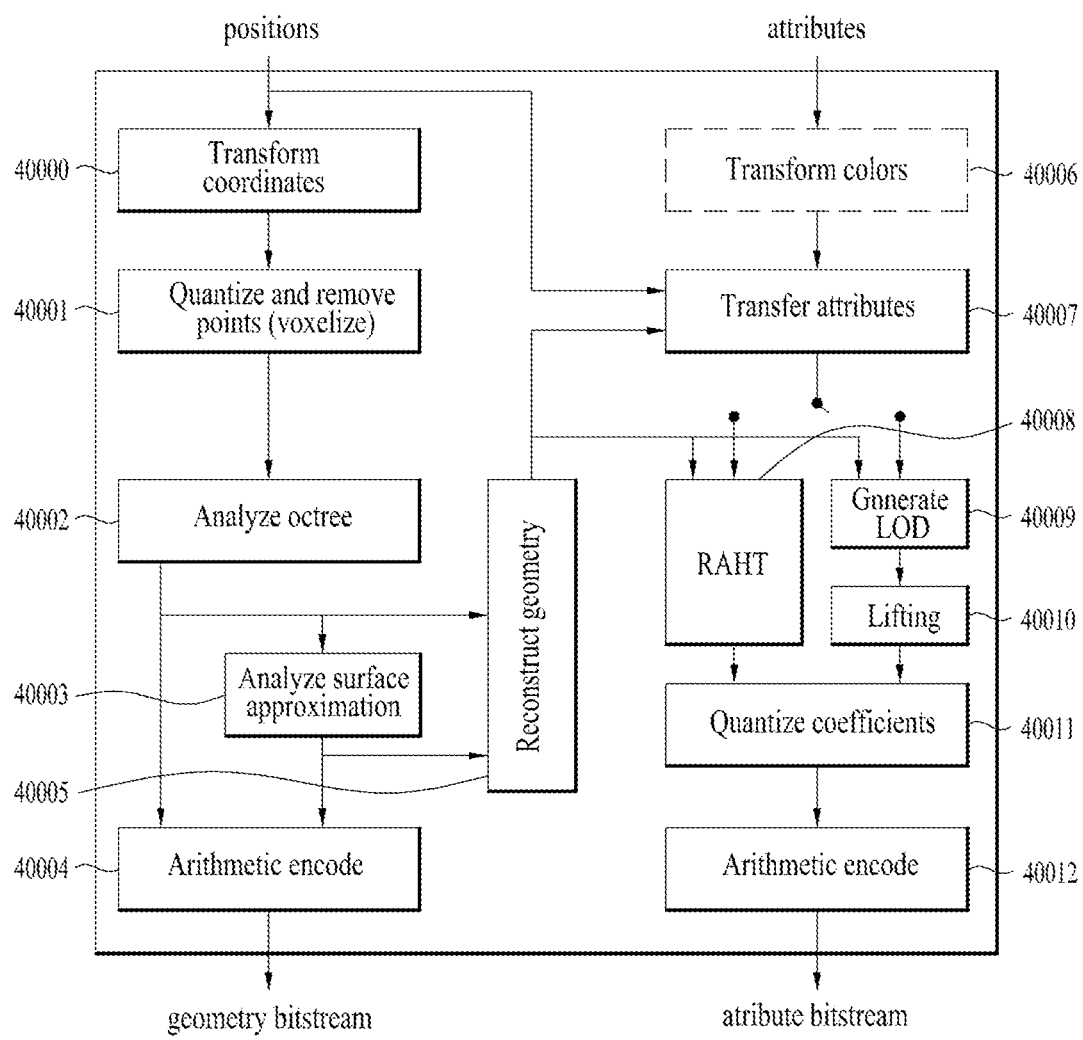
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing apparatus, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
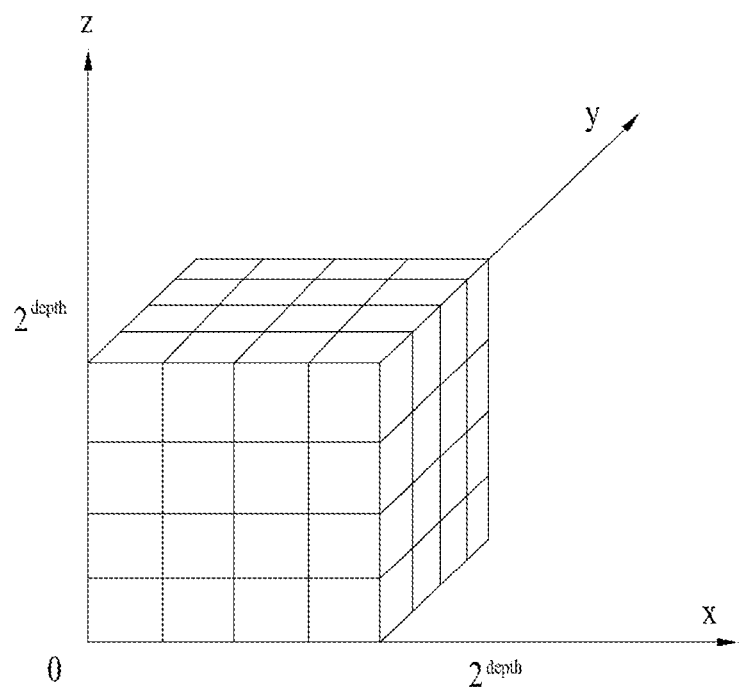
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and (2d, 2d, 2d).

Here, 2d may be set to a value constituting the smallest bounding box surrounding all points of the point cloud content (or point cloud video). Here, d denotes the depth of the octree. The value of d is determined in the following equation. In the following equation, (xintn, yintn, zintn) denotes the positions (or position values) of quantized points.

$$d=\text{Ceil}(\text{Log } 2(\text{Max}(x_n^{int}, y_n^{int}, z_n^{int}, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector ($\Delta x, \Delta y, \Delta z$) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n}\sum_{i=1}^{n}\begin{bmatrix} x_i \\ y_i \\ z_i \end{bmatrix}; \quad \text{i)}$$

$$\begin{bmatrix} \overline{x}_i \\ \overline{y}_i \\ \overline{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \quad \text{ii)}$$

$$\begin{bmatrix} \sigma_x^2 \\ \sigma_y^2 \\ \sigma_z^2 \end{bmatrix} = \sum_{i=1}^{n}\begin{bmatrix} \overline{x}_i^2 \\ \overline{y}_i^2 \\ \overline{z}_i^2 \end{bmatrix} \quad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

Triangles formed from vertices ordered 1, . . . , n

| n | triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 2³=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The upper part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The lower part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
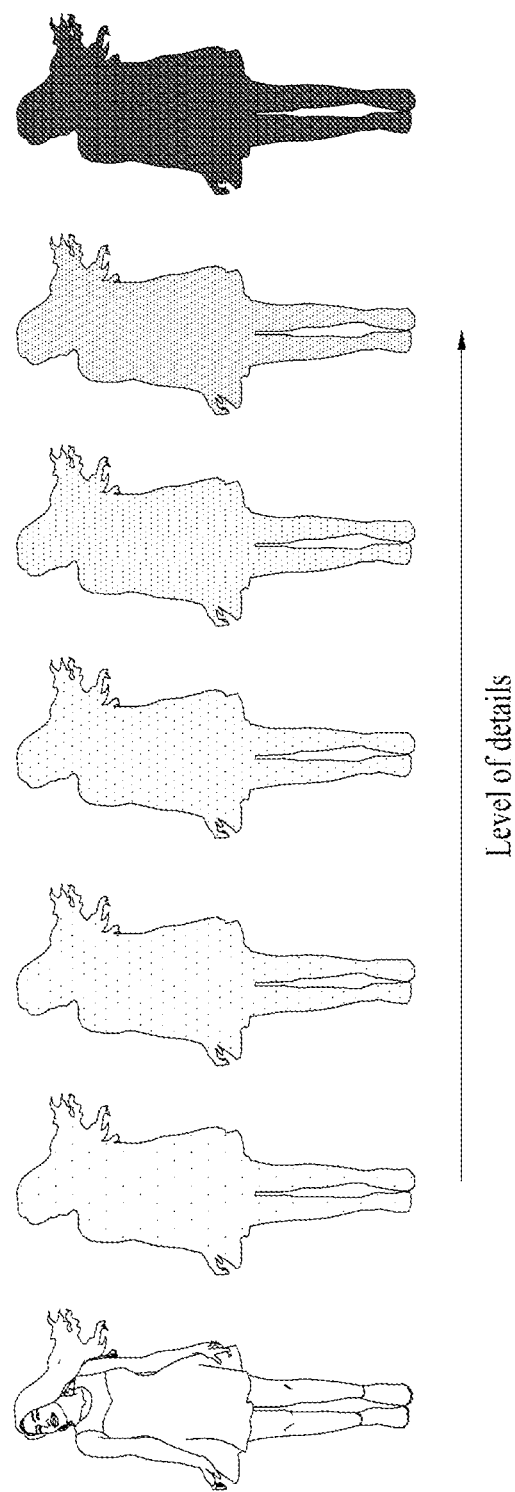
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, upsampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
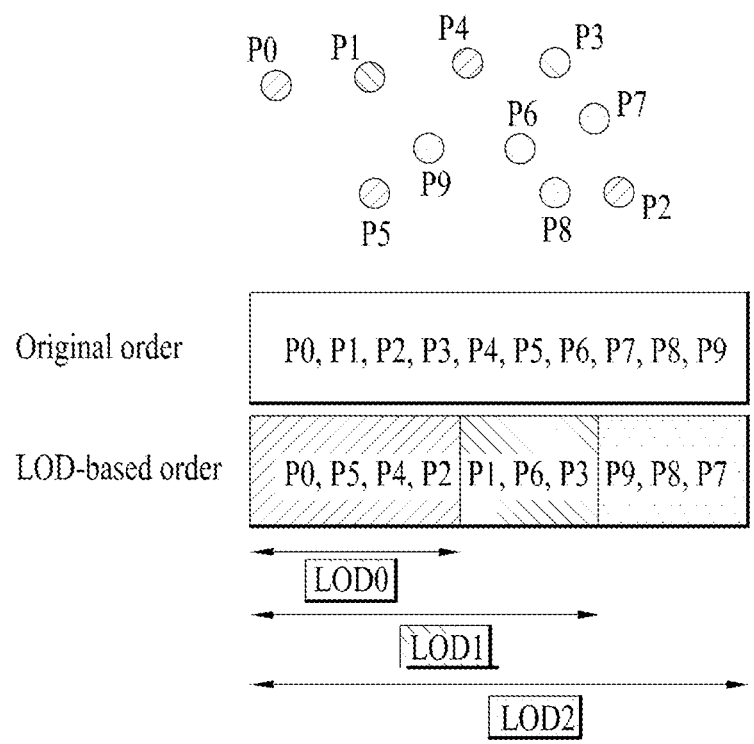
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE

Attribute prediction residuals quantization pseudo code
int PCCQuantization(int value, int quantStep) {
if( value >=0) {
return floor(value / quantStep + 1.0 / 3.0);
} else {
return -floor(-value / quantStep + 1.0 / 3.0);
}
}

TABLE

Attribute prediction residuals inverse quantization pseudo code
int PCCInverseQuantization(int value, int quantStep) {
if( quantStep ==0) {
return value;
} else {
return value * quantStep;
}
}

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

Figure 10:
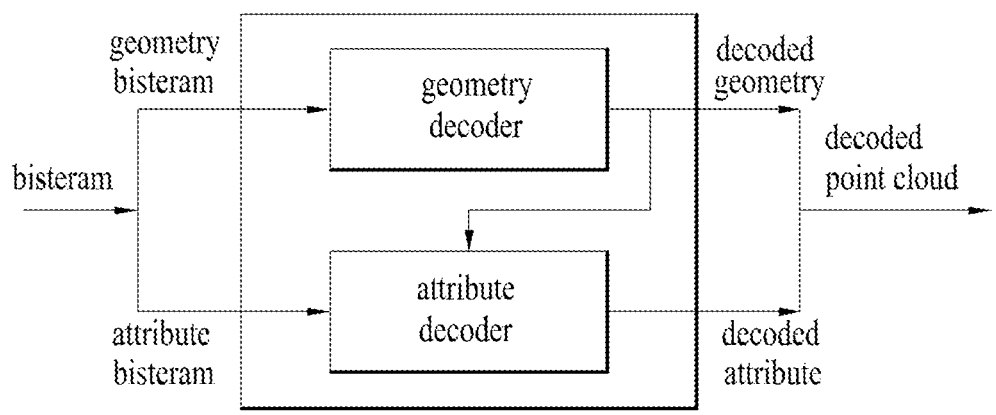
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
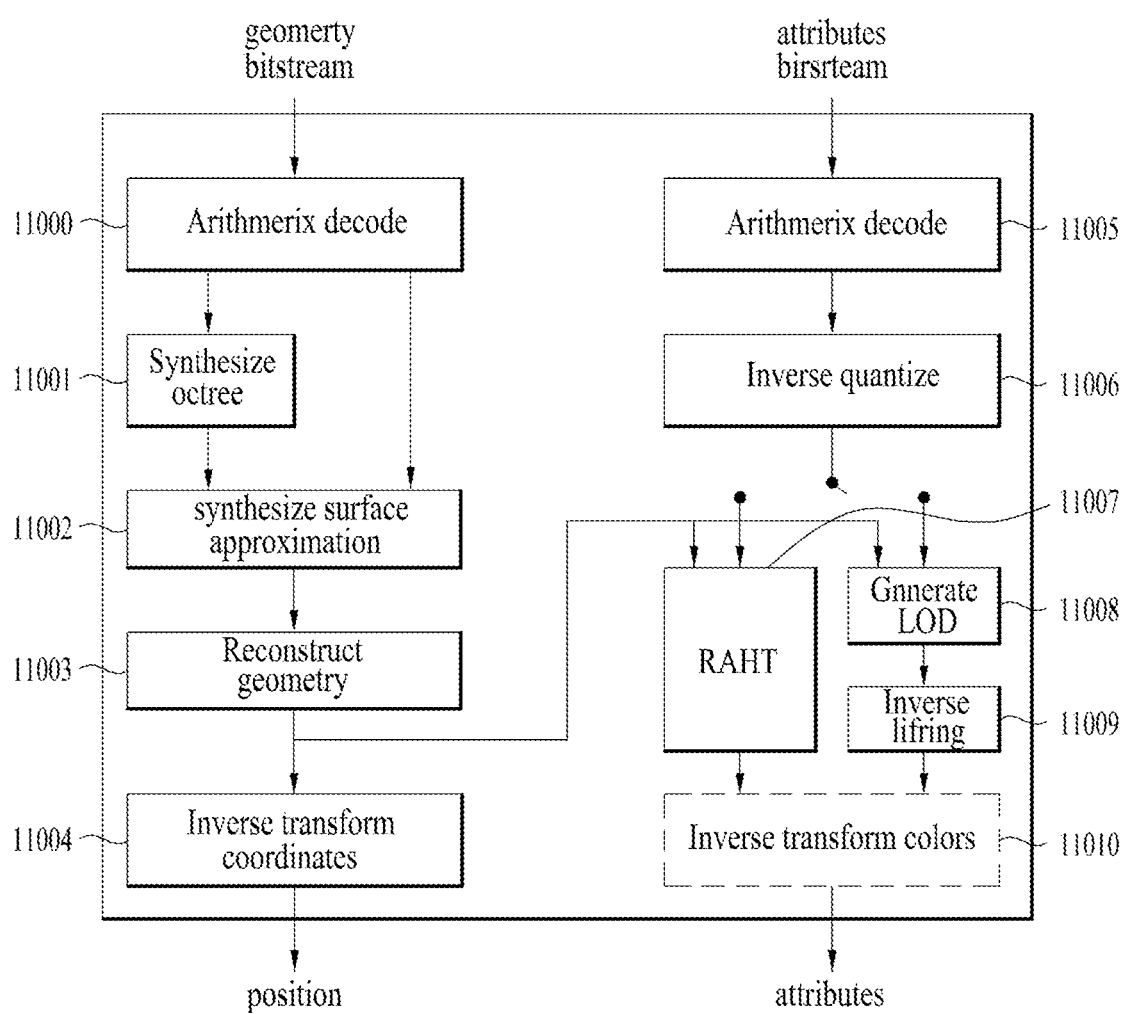
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is a reverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as a reverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
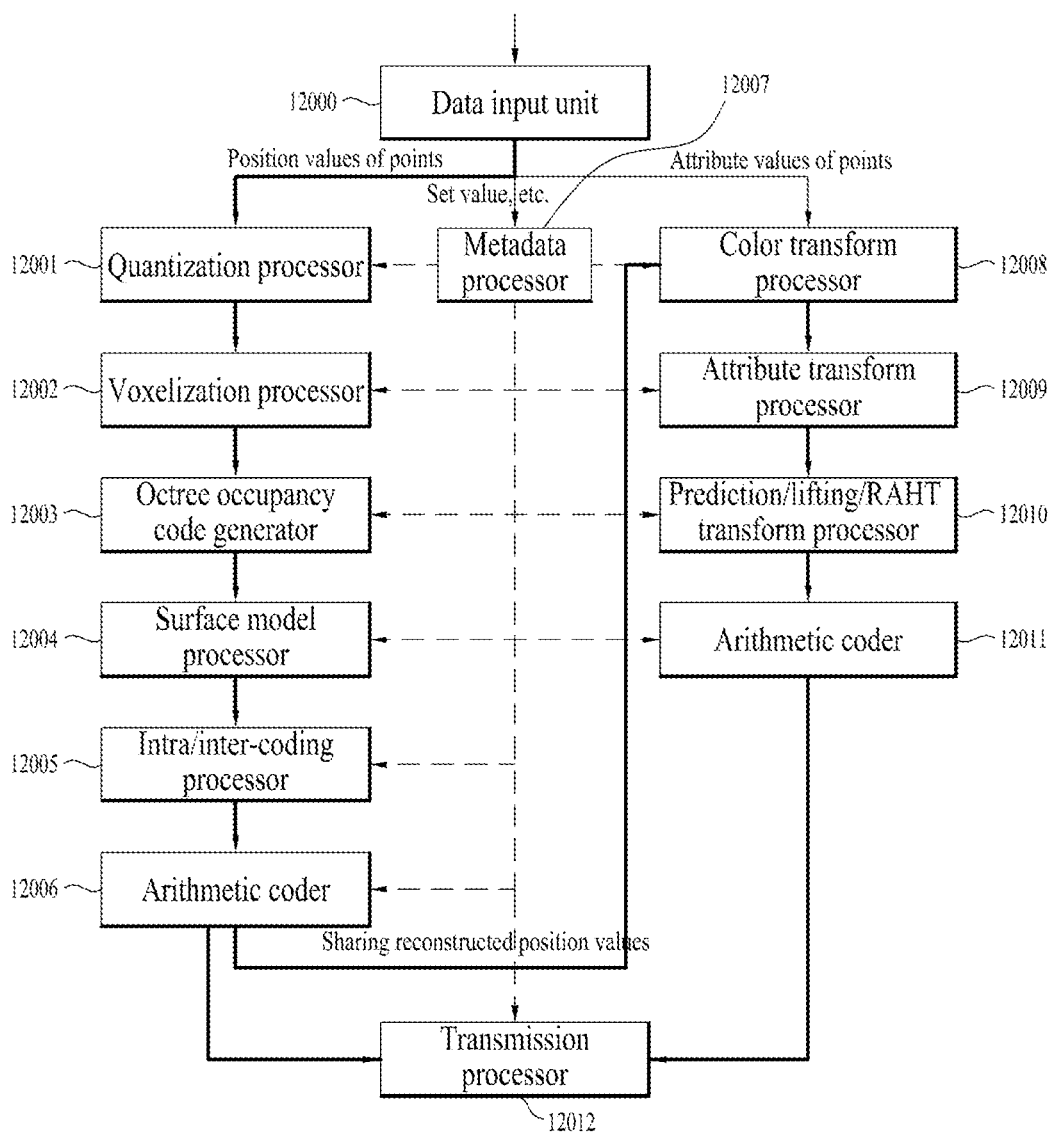
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
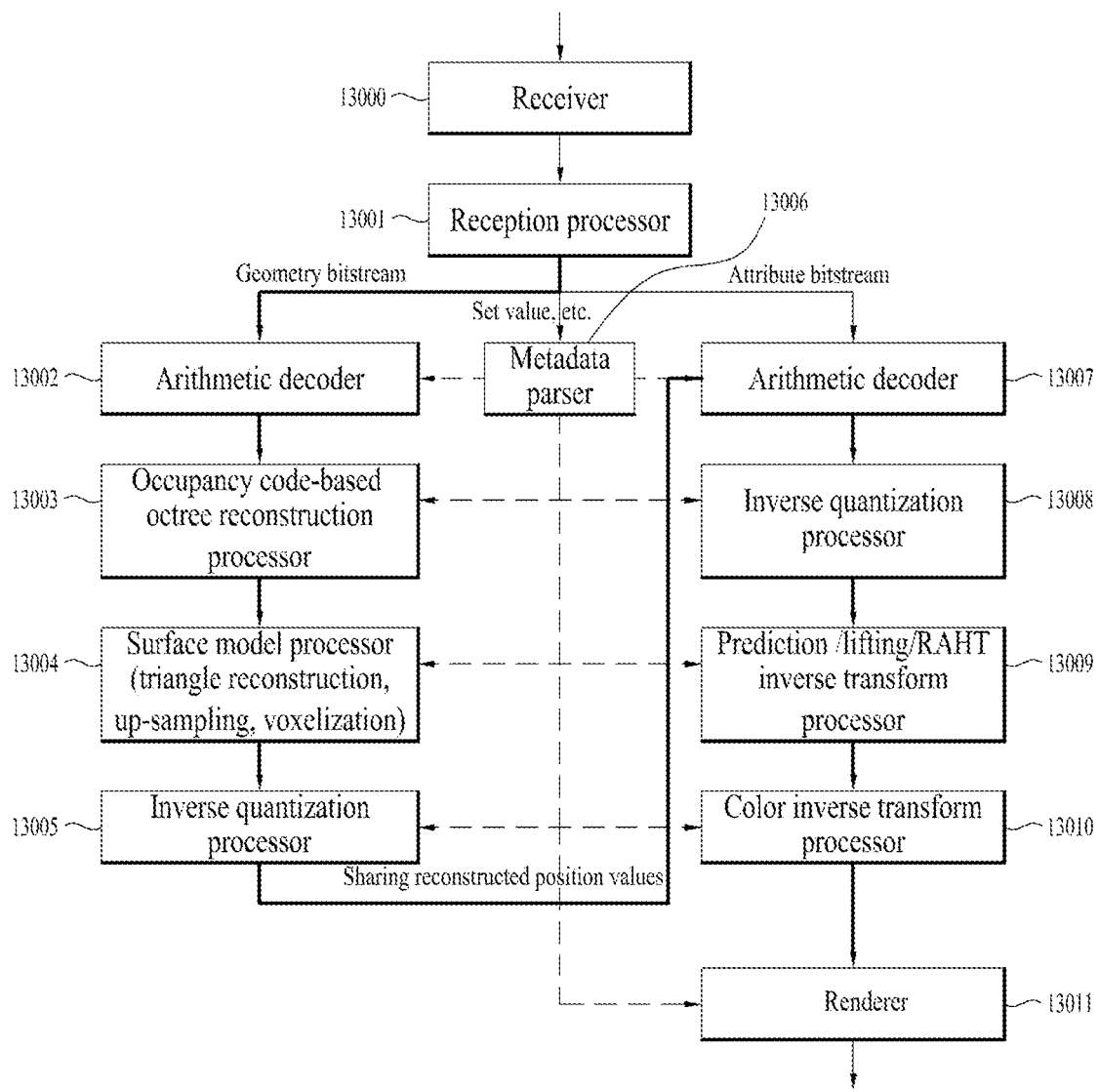
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform a reverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. A detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
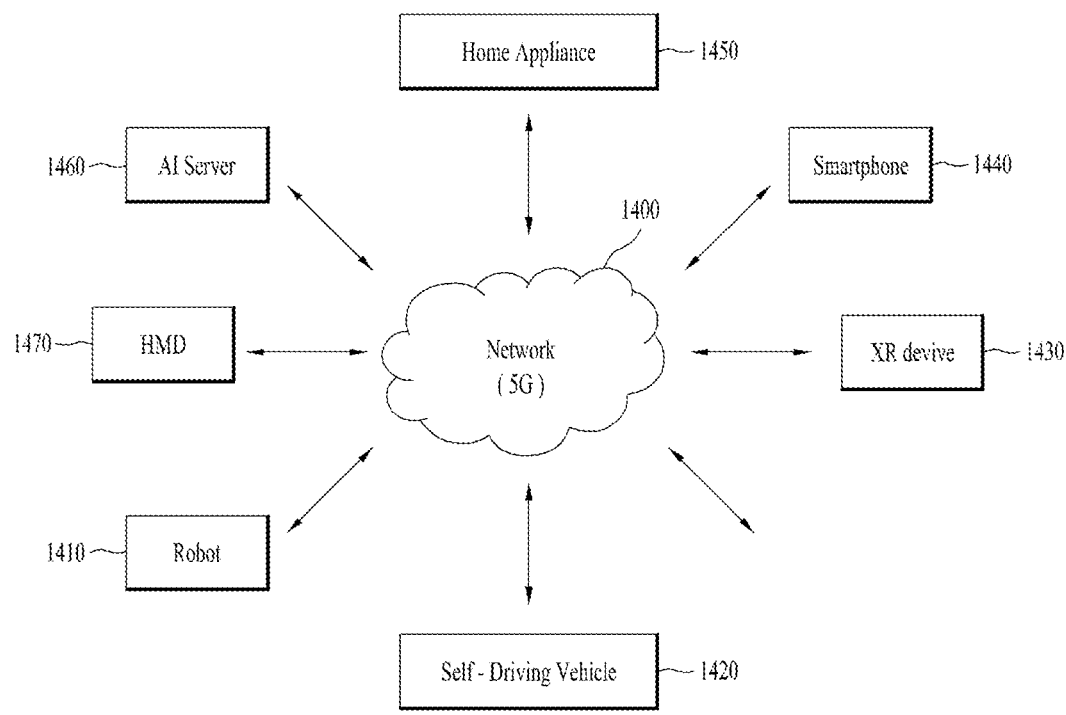
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission/reception device according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

The PCC data encoder according to the embodiments may correspond to an encoding device, an encoder, a point cloud transmission device, a point cloud data encoder, and the like.

The PCC data decoder according to the embodiments may correspond to a decoding device, a decoder, a point cloud reception device, a point cloud data decoder, and the like.

According to embodiments, geometry may be referred to as geometry information, geometry data, or the like, and an attribute may be referred to as attribute information, attribute data, or the like.

The method/device according to the embodiments may refer to a method/device for transmitting or receiving point cloud data according to embodiments.

Figure 15:
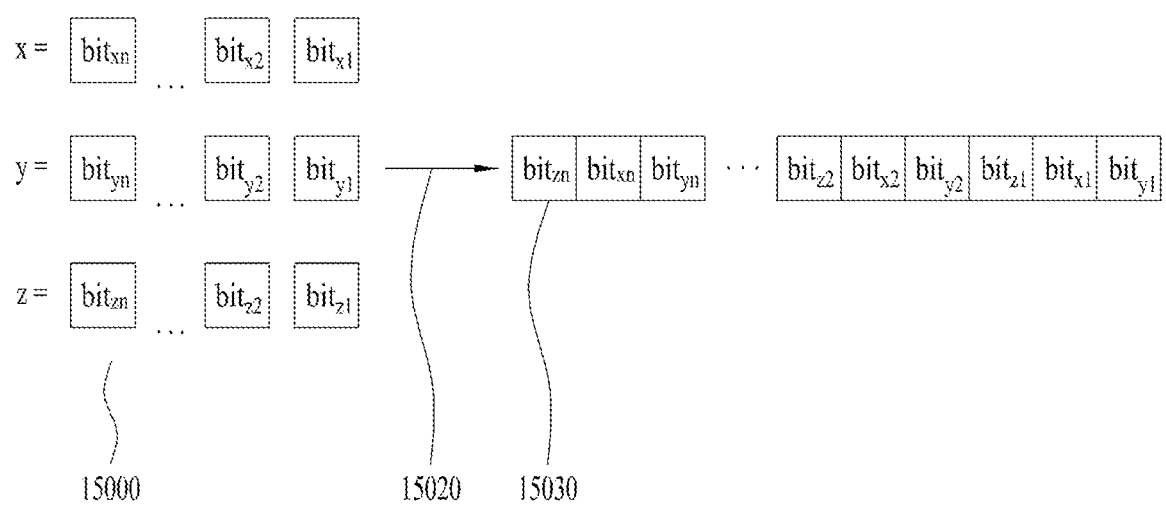
FIG. 15 illustrates a method for generating a Morton code according to embodiments.

FIG. 15 illustrates a method for generating a Morton code according to embodiments.

Figure 19:
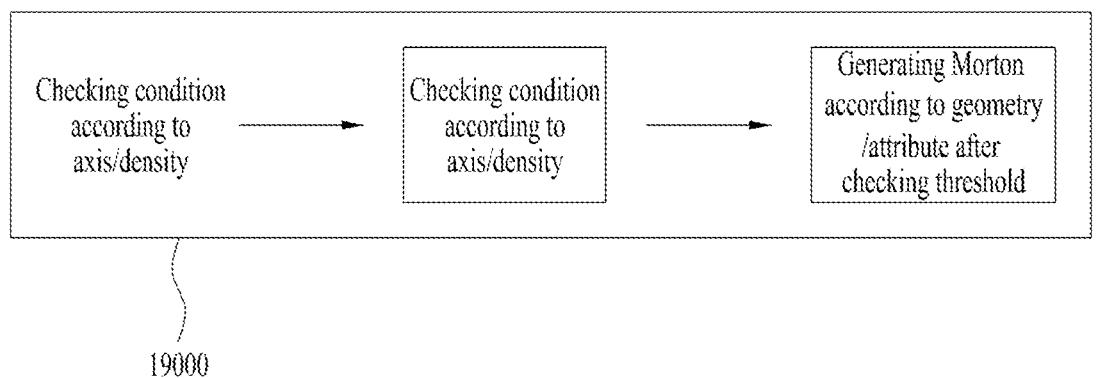
FIG. 19 illustrates a Morton code generator according to embodiments.

The Morton code generation according to the embodiments of FIG. 15 may be performed by the transmission device 10000, the point cloud video encoder 10002, the reception device 10004, the point cloud video decoder 10006 of FIG. 1, the encoding 20001, the decoding 20003 of FIG. 2, the PCC encoder of FIG. 4, the PCC decoder of FIGS. 10 and 11, the point cloud data transmission device of FIG. 12, the point cloud data reception device of FIG. 13, the XR device 1730, the smart phone 1440 of FIG. 14, the Morton code generator 19000 of FIG. 19, or the like. A device and method for performing an operation related to the Morton code generation according to embodiments may be abbreviated as a method/device according to embodiments. Each component of the devices according to the embodiments may correspond to hardware, software, a processor, and/or a combination thereof.

Embodiments relate to a method for supporting efficient point cloud compression and/or improvement of decoding performance by using sequence-by-sequence and/or slice-by-slice axis transform. During point cloud compression, the similarity between points may be increased through axis transformation such that the attribute values are closest to each other. Thereby, the bitstream size may be reduced and the quality of the decoded point cloud may be increased compared to the original point cloud.

A method/device for transmitting or receiving point cloud data according to embodiments may provide a Morton code generation method that increases encoding/decoding performance.

Embodiments use Morton code generation, a spatial coordinate search method, to compress three-dimensional point cloud data (data about positions and attributes of points related to an object).

Also, the method/device according to the embodiments may adaptively carry out the Morton code generation methods according to the embodiments based on attributes of axes. The point cloud according to embodiments is subjected to geometry compression in order of xyz, and address values of Morton codes are generated according to the order of xyz. The order of prediction of attribute values is also determined by the order of xyz of the geometry.

The method/device according to the embodiments is not limited to the order of xyz, and may further supplement the Morton code of the attribute value applied to a position in the 3D space of the point cloud. The Morton code according to the embodiments serves to connect geometry values and attribute values of the point cloud data through a Z-order search in the space. In this case, the geometry values are sorted by a search in the space, but the Morton code cannot reflect the distances of the actual geometry values. Accordingly, it is proposed that the method/device according to the embodiments additionally generate an adaptive Morton code using axis transformation.

In point cloud compression according to the embodiments, a point that is close in terms of distance in 3D space is found as a neighbor node, and an index is transmitted to decode the average of one or three most similar values based on the neighbor node. The decoder according to the embodiments identifies the position of a neighbor node closest to the current point based on the received index, and predicts the attribute value of the neighbor node from the attribute value of the current point through weight calculation. Accordingly, by selecting neighbor nodes having similar attributes but having a close spatial distance the encoder and the decoder may increase the efficiency of compression, encoding, decoding, and the like.

According to embodiments, an adaptive Morton code method may be used as a method for searching for a neighbor node in space.

A Morton code may be generated by the transmitter, the encoder, the Morton code generator, or the like according to the embodiments. The Morton code generation method according to the embodiments may generate a Morton code based on a weight. For example, the method may include 1) a method of axis-based adaptive Morton code generation, 2) a method of bit allocation Morton code generation, and 3) a method of Morton code generation according to value distribution.

Regarding the method of axis-based adaptive Morton code generation according to the embodiments, the method/device according to the embodiments may perform the axis-based adaptive Morton code generation. The method/device according to the embodiments may calculate a bounding box of a point cloud and adjust a bit interleaving unit based on an axis length. In the Morton code calculation according to the embodiments, when binary bit values of coordinates of a point on the xyz axes are given, a Morton code may be generated by bit interleaving based on the order of zyxzyxzyx . . . . The method/device according to the embodiments assigns the lengths of the x, y, and z axes to a max edge, a mid edge, and a min edge, respectively, and identifies the longest axis. It divides the lengths of the longest axis and the middle axis based on the shortest axis, and takes log 2 of the values obtained by the division. Here, the values by rounding up the calculated values are countY and countZ. Each count value indicates the number of times to repeat a bit. For example, when the length of the x-axis is 10, the length of the y-axis is 40, and the length of the z-axis is 20, countY is 2 and the countZ is 1. And, the bit order of the Morton code is given zzyyxzyyxzyxzyx. That is, z is repeated once, and y is repeated twice. Thus, a Morton code is generated based on the length of the axes.

The method/device according to the embodiments may perform the above process for all points in the bounding box. Each point is mapped one-to-one to a Morton code. When the mapped Morton code is sorted in ascending order, points may be searched for in the depth-first search order in the octree.

Regarding the method of bit allocation type Morton code generation according to the embodiments, the method/device according to the embodiments may bit-interleave the Morton code by applying a weight to any one of x, y, and z values regardless of the data of the point cloud. According to embodiments, even if the bounding box related to the characteristics of data is not calculated, the method/device according to the embodiments may acquire point cloud data that is long or short along a specific axis based on the width, height, and depth. That is, a Morton code may be generated even without any information about the bounding box.

For example, point cloud data may be spread wide along the x-axis and z-axis in the space, but the points thereof may be clustered along the y-axis in the distribution chart. In addition, in the case of LiDAR data, the data is often spread to the left and right and front and rear of the car, but the data at the top and bottom thereof may be less important.

Accordingly, for such a data sequence, bits for Morton code generation may be further allocated to the x and z axes to generate a Morton code.

Regarding the method of Morton code generation according to a value distribution according to the embodiments, the method/device according to the embodiments may generate a Morton code according to a value distribution. The method/device according to the embodiments may generate a Morton code by bit-interleaving the Morton code based on a distribution chart obtained by scanning all the x, y, and z values of the point cloud. The difference of the Morton code generation according to the distribution of values from the axis-based Morton code generation is that it is not necessary to calculate the weight for a portion that has no value. For example, the y-axis of the bounding box has values from 0 to 100, but points may not actually be distributed in a range from 10 to 50 within the bounding box. A Morton code may be generated according to the value distribution, considering even the portions having no point.

In addition to the adaptive Morton code method according to the embodiments, a method for calculating an adaptive Morton code may be specified and diversified by expanding the bounding box of the point cloud. With the adaptive Morton code method, the performance may be improved.

According to embodiments, an issue of a difference in Morton code that occurs at the same Euclidean distance in space may be addressed. Presented herein are conditions under which the order of the xyz axes may be changed to various forms, and the operation may be performed based on the content, tile, slice, geometry value, attribute value, or the like. Also, the embodiments define whether to change the axis transformation according to a threshold. Accordingly, the embodiments propose a condition for mapping of an adaptive Morton code for performing adaptive spatial search based on the content, tile, slice, range, or attribute value, and searching for a nearby neighbor node. The point cloud encoding and decoding according to the embodiments may change the Morton code according to various data characteristics of point cloud data, rather than using merely one Morton code type.

In order to address the issue of failing to reflect the difference between the actual coordinates and the Morton code distance that occurs in the process of Morton codes of point cloud data, embodiments provide a method for generating an adaptive Morton code. That is, the method according to the embodiments may generate a different adaptive Morton code for each axis according to the content, tile, slice, range, attribute value, or geometry value. In addition, by configuring different options for each axis/density through a threshold setting method according to the embodiments, whether to apply the operation to each content, tile, slice, attribute value, or geometry value may be set differently.

For example, the operation of changing the order of the axes according to the embodiments may be performed before geometry encoding by the transmission device or the encoder according to the embodiments. Also, the operation of changing the order of the axes according to the embodiments may be performed as a process of changing the order of axes during attribute encoding after the geometry encoding. Furthermore, during the axis-based change, the operation may be applied to both a case where there is a threshold and a case where there is no threshold. An operation related to the presence or absence of a threshold may be performed before the geometry encoding, or may be performed during attribute encoding after the geometry encoding.

Embodiments may be carried out in combination with the above-described method of axis-based adaptive Morton code generation, bit allocation type Morton code generation, or Morton code generation according to value distribution.

The method/device according to the embodiments may generates a Morton code based on the method according to the embodiments (axis-based adaptive Morton code generation, bit allocation type Morton code generation, or Morton code generation according to value distribution), and additionally change the order of generation of Morton codes based on conditions according to the axis/density/threshold. By changing the Morton address based on the conditions according to the embodiments, different Morton codes may be generated according to ranges.

FIG. 15 illustrates a Morton code generation method according to embodiments.

The order of generation of Morton codes according to the embodiments includes two types: one may be an order of generation of Morton codes according to the lengths of the axes, and the other is an order of generation of Morton codes according to the density.

A point may have X, Y, and Z coordinate values 15000 that represent the position of the geometry data. The X, Y, and Z coordinate values on the respective axes are represented by bits 15010. When the coordinate value on each axis has N bits, the bit(s) of the respective axes may be sorted into a single bitstream by scanning the respective axes (15020), and thus a Morton code may be generated (15030). For example, the order in which the bits are sorted may be XYZ, and a Morton code may be generated with the bits sorted in order of the N-th bit for the X-axis, the N-th bit for the Y-axis, the N-th bit for the Z axis, . . . , the second bit for the X-axis, the second bit for the Y-axis, the second bit for the Z-axis, . . . , the first bit for the X-axis, the first bit for the Y-axis, and the first bit for the Z-axis.

The Morton code generation according to the embodiments may be performed by the PCC encoder of FIG. 4, in between geometry encoding and attribute encoding in the PCC encoder of FIG. 4, by the attribute transformer 4007 of FIG. 4, by the PCC decoder of FIG. 11, in between geometry decoding and attribute decoding by the PCC decoder of FIG. 11, and/or by an encoder/decoder or the like corresponding to FIGS. 4 and 11.

The coordinates representing a point of point cloud data according to the embodiments may be X, Y, and Z axes, and may further include another type of coordinates. The Morton code generation method according to the embodiments may be applied to position values of points according to various coordinate systems. Hereinafter, points are described as XYZ coordinates as an example. XYZ may be replaced with other factors depending on the type of the coordinate system. For example, other coordinate systems may further include a cylindrical coordinate system, a spherical coordinate system, or the like into which xyz coordinates are transformed to represent a point cloud.

FIG. 16 illustrates a method for generating a Morton code according to embodiments.

FIG. 16 illustrates one or more Morton code generation operations that may be combined with the Morton code generation method described with reference to FIG. 15 according to embodiments. Each operation of FIG. 16 may be performed by the method/device according to the embodiments described with reference to FIG. 15.

The method/device according to the embodiments may generate a Morton code according to axes (S16000). The method/device according to the embodiments may generate a Morton code according to axes (S16010). The method/device according to the embodiments may generate a Morton code according to axes (S16020). The method/device according to the embodiments may use at least one of the axis-based method (S16000), the density-based method (S16010), or the threshold-based method (S16020), or may use a combination of the at least one method. Each method is described below. It should be noted that the order of description of the methods does not limit the meaning of the embodiments.

For example, the Morton code generation methods according to the embodiments may include Morton code generation according to axes only, Morton code generation according to density only, Morton code generation according to both the axes and density, a method using both the Morton code generation according to the axes and the Morton code generation according to the density, and a method using both the Morton code generation according to the density and application of a threshold, and a method using the Morton code generation according to both the axes and the density and the application of the threshold.

S16000 Morton Code Generation According to Axes

According to embodiments, point cloud data may include one or more frames. A frame includes points present on the x, y, and z axes. A unit containing points distributed in space is called a bounding box. The bounding box may be defined as a space including the max of the x, y, and z values to the min of the x, y, and z values. The length/size of the bounding box may vary according to the sequence. The length of each axis (the length of the X-axis, the length of the Y-axis, the length of the Z-axis) indicates how long or short the distribution of points is. The order of the three axes of xyz may be changed by sorting the axes in ascending and/or descending order. The order of axes may be determined for each sequence, tile, or slice, or based on a geometry unit, attribute unit, unit of geometry and attribute, or the like.

According to embodiments, the same Morton code may be generated for each axis. According to embodiments, a different Morton code may be generated for each axis. A bounding box according to embodiments has a width, a depth, and a height. Based on each axis where the bounding box is located, the axial length may be checked. For example, the y-axis, z-axis, and x-axis may be arranged in descending order of the lengths of the axes from the longest to the shortest. In generating a Morton code from the three axes, the bits constituting the Morton code may be generated in order of the n-th bit of the y-axis, the n-th bit of the z-axis, and the n-th bit of the x-axis. This may be an operation of interleaving the bits of the Morton code in ascending and/or descending order of the lengths of the three axes. That is, the Morton code may be generated by bit-interleaving the bits of the axes based on the method and the conditions according to the embodiments.

Accordingly, the method/device according to the embodiments may compare the lengths of the axes of the bounding box, and may diversify the bit interleaving based on the characteristics of the lengths. The bit interleaving of the Morton code may provide a change of the Morton code that reflects the characteristics of the actual data and the distribution of the data. As a result, the point cloud may be efficiently compressed and reconstructed.

Operation of Axis-Based Morton Code Generation According to Embodiments

When ($x\_i$, $y\_i$, $z\_i$) is the position of the current point I, the lengths of the bounding box along all three axes may be calculated as length_x, length_y, and length_z. Considering the direction of the longest axis, more relevant attribute neighbor candidates may be found. The longest axis for the search of the corresponding neighbor may be considered. In particular, in the case of category 3 data, the points may be more densely distributed within the X-axis or Y-axis. By searching the X and Y axes rather than the Z axis, the nearest neighbors may be found faster.

The obtained lengths length_x, length_y, and length_z may be stored in ascending order. The lengths of the axes may correspond to SortedAxisOrder[0], SortedAxisOrder[1], SortedAxisOrder[2], respectively. The sorted order may be the input of the order of X, Y, Z coordinates of the Morton code.

The sorted order according to the embodiments is a bit interleaving order. The current order of z, y, and x may be changed by sorted axisSortedAxisOrder[2], SortedAxisOrder[1], SortedAxisOrder[0]. The order may be created to have identical Morton code implementations. The sorted axes may be adaptively changed to the order of MC_i corresponding to the spatial search order. For the first candidate of the nearest neighbor weight prediction, the influence in the direction of the longest axis may be considered. The method/device according to the embodiment may provide a changed spatial order for the bit interleaving order of yxz.

Embodiments may set the order of searching a space by a dynamic Morton code.

The candidate of the nearest neighbor may be changed due to the changed adaptive Morton code.

Neighbor candidates may be positioned closer in the direction of the longest axis. Therefore, adaptive Morton code prediction may be more effective in terms of spatial presence.

The Morton code generation operation according to the embodiments may efficiently provide an adaptive Morton code by changing the Morton address generation.

Embodiments may additionally apply a threshold of a ratio of the min/max lengths of a slice in order to change the Morton address order.

When the Morton code according to the embodiments is used, time complexity may be lowered and encoding/decoding time efficiency may be increased.

S16010 Morton Code Generation According to Density

There is a density with respect to each axis of the space where the points constituting the point cloud data are distributed. The method/device according to the embodiments may generate a density of point(s) with respect to each axis based on the method of axis-based adaptive Morton code generation, the method of bit allocation type Morton code generation, the method of Morton code generation according to the value distribution, or the like.

The density may differ among the axes. For example, the density may be higher on a shorter axis.

According to embodiments, bits of coordinates on the respective axes may be sorted (bit-interleaved) in ascending order of densities. According to embodiments, the bits of coordinates on the respective axes may be sorted (bit-interleaved in descending order of densities. When the bits are sorted in ascending order of densities, points having data represented in an order of the x, y, and z axes may be sorted again according to the densities according to embodiments. For example, when the density on the x-axis is 10, the density on the y-axis is 5, and the density on the z-axis is 8, bit-interleaving may be performed in ascending order of densities to generate a Morton code in order of y, z, and x in the Morton code generation.

The changed position of the point may be changed according to a geometry unit, an attribute unit, a geometry and attribute unit, or the like. Also, the axis order unit may be changed in a sequence unit, a tile unit, and a slice unit.

In addition to the method (FIG. 16) of using the Morton code in the order of xyz according to the embodiments, a Morton code may be generated by changing the order of xyz based on various conditions. Using this Morton code, point cloud data is compressed and reconstructed. As the position of the point is changed, neighbor nodes of related geometry values and/or attribute values may be easily found with respect to the longest axis and/or the shortest axis. That is, due to the Morton code bit-interleaved according to the characteristics of the points of the actual point cloud data, such as the axis or the density, the neighbor nodes may be easily found.

That is, encoding/decoding efficiency may be increased by changing only the order of xyz data of the point cloud that is input to the encoder and/or decoder according to the embodiments. The latency of the operation of changing the axis order is not a problem, and encoding/decoding efficiency may be effectively increased.

In particular, there may be point cloud data corresponding to category 3, for example, low-density data such as autonomous driving data, with low correlation between adjacent data, or static data such as category 1 with high density and high correlation between adjacent data. For the reflectance information about such data, a specific axis may be short. The longest axis may be searched first such that the longest axis is arranged in the first digit (the first digit in order in configuring a Morton code, or the rightmost bit in the bitstream). When the specific axis is searched first, more neighbor nodes may be secured within the search range, and accordingly attribute values may be efficiently predicted. Furthermore, compression efficiency may be increased by searching the long axis first. Accordingly, the method/device according to the embodiments uses a Morton code sorting method capable of searching for more neighbor nodes within a range based on an axis, density, or other characteristics for fast compression and reconstruction of point cloud data.

A method for generating a Morton code according to a condition according to embodiments will be further described with reference to FIG. 17.

In the density-based Morton code generation according to the embodiments, a ratio may be generated by performing a projection based on xoy/yoz/xoz in a specific plane in space. Here, the ratio may be generated by dividing the number of points by the total number of points. Here, a threshold for density-based Morton code conversion may be set to, for example, 20%.

According to the condition according to the embodiments, setting information about the Morton code may be generated by the encoder and transmitted to the decoder as signaling information of the bitstream.

S16020 Threshold of Morton Code Generation Order

For example, the shape of the bounding box may depend on the distribution of point(s), namely, data characteristics. When the bounding box has a shape similar to a cube, bit interleaving of the Morton code may not be performed. Accordingly, in order to cover various scenarios, a method for determining whether a bounding box is similar to a cube based on a threshold according to embodiments is further provided.

Regarding the characteristics of point cloud data according to the embodiments, there may be a bounding box having a cuboidal shape that is long or short along one axis of the bounding box.

The compression and reconstruction efficiencies of the points in a cuboidal bounding box may be greater than the compression and reconstruction efficiencies of the points in a non-cuboidal bounding box.

The point cloud data according to embodiments may have the same data characteristics as category 1. The bounding box of these points may be of a cube type. That is, data obtained by 3D scanning of a static object, data having high density and high correlation, and the like may have a sequence of cubes. When the point cloud data is partitioned, there may be data whose slice has a cube. Due to these data characteristics, it may be difficult to increase the efficiency of data compression and reconstruction.

Accordingly, after determining the ascending/descending method based on the axis/density according to the embodiments, the shape of the data may be determined. For example, when the ratio of the shortest axis to the longest axis of the bounding box is less than or greater than a certain threshold, the Morton code generation order may not be changed. In addition to the axis-based generation S16000 and/or the density-based generation S16010 according to the embodiments, there may be a threshold-based determination option. The threshold-based determination method will be described with reference to FIG. 18.

A device for transmitting point cloud data according to embodiments includes an encoder configured to encode point cloud data, and a transmitter configured to transmit a bitstream including the point cloud data.

According to embodiments, the encoder generates a Morton code for the point cloud data.

According to embodiments, the encoder generates an order of the Morton code based on each of axes for geometry data of the point cloud data.

The geometry data contains a coordinate value on each of the axes, and the Morton code is generated based on a binary bit of the coordinate value on each of the axes. Also, the binary bits of the Morton code are sorted based on lengths of the axes.

According to embodiments, the encoder generates an order of the Morton code based on a density of geometry data of the point cloud data.

The geometry data contains a coordinate value on each of axes, and the Morton code is generated based on a binary bit of the coordinate value. Also, the binary bits of the Morton code are sorted based on a density of one or more points with respect to each of the axes.

According to embodiments, the encoder generates an order of the Morton code based on a density of geometry data of the point cloud data.

The geometry data contains a coordinate value on each of axes, and the Morton code is generated based on a binary bit of the coordinate value. Also, the binary bits of the Morton code are sorted based on a density of one or more points with respect to each of the axes.

The Morton code generation operation of the encoder according to the embodiments may be performed based on a threshold related to distribution of one or more points of the point cloud data.

According to embodiments, a receiver or reception interface receiver configured to receive a bitstream including point cloud data, and a decoder configured to decode the point cloud data.

According to embodiments, the decoder generates a Morton code for the point cloud data.

Figure 17:
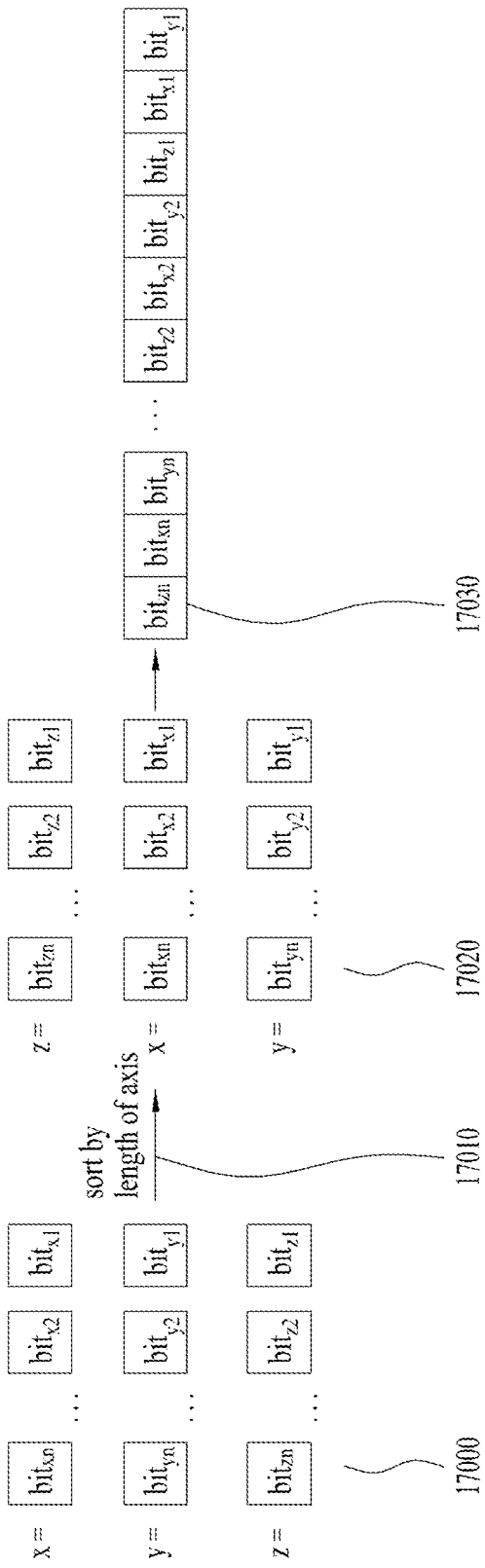
FIG. 17 illustrates a method for generating a Morton code according to embodiments.

FIG. 17 illustrates a method for generating a Morton code according to embodiments.

FIG. 17 illustrates an implementation of the Morton code generation S16000 according to the axes and the Morton code generation S16010 according the density in FIG. 16. A method/device according to embodiments may generate a Morton code according to axes, according to a density, and/or according to both axes and density.

Points of the point cloud data for the encoder and the decoder according to embodiments have position values. This position has values expressed in bits (17000). Every point in space has geometry coordinate values of x, y, and z (17000). The coordinate values have binary bits (17000).

The method/device according to the embodiments may determine a sorting type of x, y, and z (17000) expressed in binary bits among sorting in ascending order of the axes, sorting in descending order of the axes (S16010), sorting in ascending order of densities, sorting in descending order of densities (S16000), or sorting based on a combination of axes and densities. The position values on the respective axes are rearranged based on the determined order (17010).

For example, xyz bits sorted in order of z, y, and x are generated from the bits in order of x, y, and z according to the above specific condition (17020).

According to embodiments, when an input is directly provided to the encoder without a specific condition (the user provides an input for encoding in order of zxy), the sorting may be omitted. A Morton code may be generated only by signaling without sorting.

After performing bit interleaving in the changed order (17020), a Morton address for a coordinate value having one binary bit is generated (17030). The Morton code 17030, which is one bitstream for three axes, is generated by sorting the bits one by one in order of z, x, and y.

The methods/devices according to the embodiments may encode and decode a point based on the changed Morton address.

Due to the changed Morton address, points on the longest axis may be searched for first. In order to generate a Morton address for an efficient search, the method/device according to embodiments may use information (axial length, density value) related to a bounding box containing point(s).

The method/device according to the embodiments may calculate a density along each axis. A shorter axis has a higher density. This is because the number of points does not vary according to each axis, but the number of points included in a certain space or bounding box is the same. The bits of the Morton code may be interleaved considering the density. Also, according to embodiments, a threshold may be applied in bit interleaving of the Morton code (S16020).

According to embodiments, a short axis may not be searched for neighbor nodes. Therefore, it is more efficient to search for neighbor nodes around the long axis. For the efficiency of such neighbor node search, the Morton code is bit-interleaved.

FIG. 18 shows a threshold of the Morton code generation order according to the embodiments.

FIG. 18 shows an operation (S16020) related to the threshold of the Morton code generation order of FIG. 16.

As an example, when an execution process with a threshold is expressed as a pseudo code as follows.

```
inline void
compute AxisOrder( )
{
auto bbox = pointCloud.computeBoundingBox( );
for (int i = 0; i < 3; i++) {
axisInfo[i].length = bbox.max[i] - bbox.min[i];
axisInfo[i].order = i;
}
sort(axisInfo.begin( ), axisinfo.end( ));
double minMaxAxisRatio = double(axisInfo[2].length) /
double(axisInfo[0].length);
if (minMaxAxisRatio < 5.0) {
axisInfo[0].order = 0;
axisInfo[1].order = 1;
axisInfo[2].order = 2;
}
}
``` axisInfo[i].length, the length for each axis, may be obtained based on a difference between the long axis of the bounding box (bbox.max[i]) and the short axis of the bounding box (bbox.min[i]).

For each axis (for (int i=0; i<3; i++)), the length of each axis and the order of each axis (axisInfo[i].order) may be checked.

minMaxAxisRatio indicates a threshold. The threshold may be a ratio of a middle axis to a long axis. According to embodiments, the threshold may further include a ratio of a short axis to the middle axis and a ratio of the short axis to the long axis. Various ratios of the lengths of the axes may be applied as thresholds according to embodiments.

According to embodiments, a ratio between two axes is calculated (double minMaxAxisRatio=double(axisInfo[2].length)/double(axisInfo[0].length)).

In the operation of comparing the threshold (minMaxAxisRatio), it is checked whether minMaxAxisRatio is less than, for example, 5.0. When minMaxAxisRatio is less than a specific value (a value other than 5.0 may be used), the order of the axes may be determined as axisInfo[0].order=0; axisInfo[1].order=1; axisInfo[2].order=2. For example, when the bounding box is close to the shape of a cube, the Morton code order may not be changed. When the bounding box is close to the shape of a cuboid, the Morton code order may be changed.

According to embodiments, the Morton code generation order (S16000 and/or S16010) and the threshold of the Morton code generation order (S16020) may be used together. In addition, the operations S16000, S16010, and S16020 may be individually applied differently according to each geometry, each attribute, or each combination of geometry and attribute.

FIG. 19 illustrates a Morton code generator according to embodiments.

FIG. 19 illustrates a Morton code generator 19000 configured to perform the operations described with reference to FIGS. 15 to 18 according to embodiments.

The Morton code generator of FIG. 19 may correspond to or be included in the transmission device 10000, the point cloud video encoder 10002, the reception device 10004, the point cloud video decoder 10006 of FIG. 1, the encoding 20001, the decoding 20003 of FIG. 2, the PCC encoder of FIG. 4, the PCC decoder of FIGS. 10 and 11, the point cloud data transmission device of FIG. 12, the point cloud data reception device of FIG. 13, the XR device 1730 of FIG. 14, the smartphone 1440, or the like.

FIG. 19 shows components of a PCC encoder and decoder according to embodiments that perform operations related to FIG. 16 and the like.

The Morton code generator 19000 may perform an operation of generating a Morton code according to a condition according to embodiments and an operation of generating a Morton code for each geometry/attribute after checking a threshold.

The Morton code generator 19000 may be included in the PCC encoder according to embodiments. The Morton code generator 19000 may generate a Morton code in between the geometry coding unit and the attribute coding unit in the PCC encoder. The method/device according to the embodiments may perform an operation such as LOD generation based on the Morton code generated according to the embodiments.

The Morton code generator 19000 may generate a Morton code based on a condition for each axis/density. The condition for each axis/density may be a set value in a system or a value input by a user. In addition, the transmission method/device according to the embodiments may deliver, to the reception method/device, parameter information (see FIGS. 21 to 24) related to the condition for each axis/density in the bitstream (see FIG. 20).

The Morton code generator 19000 may be referred to as a Morton code generation unit or the like.

The Morton code generator 19000 may be operated before geometry encoding (e.g., the geometry encoding part of FIG. 4) or after the geometry encoding (e.g., between the geometry encoding part and the attribute encoding part of FIG. 4). For example, the Morton code generator may be connected to the geometry encoder according to the embodiments. According to embodiments, there may be configurations such as a Morton code generator/geometry encoder and/or a geometry encoder/Morton code generator. In addition, on the receiving side corresponding to the transmitting side, the Morton code processor according to the embodiments may be connected to the geometry decoder. According to the embodiments, there may be configurations such as a Morton code processor/geometry decoder and/or a geometry decoder/Morton code processor.

The reception method/device according to the embodiments may decode the point cloud data based on the reverse process of the operation of the Morton code generator 19000.

The transmission method/device according to the embodiments may encode the point cloud data based on the following parameters (which may be referred to as signaling information or metadata).

The method/device according to the embodiments may perform the encoding operation according to the embodiments, generate the following parameters related to the encoding operation, and deliver the parameters in the bitstream (see FIGS. 20 to 24) to the reception method/device according to the embodiments.

The transmission method/device according to the embodiments may determine a condition (axis_condition_selection) for each axis/density. The Morton code generator 19000 performs bit interleaving of the Morton code under a predetermined condition.

The transmission method/device according to the embodiments may define the bit interleaving order based on the ascending/descending order (ascending_order_flag). The bit interleaving order may be delivered from the encoder to the decoder through the bitstream (see FIGS. 20 to 24). For example, ascending_order_flag equal to 0 may indicate the ascending order. ascending_order_flag equal to 1 may indicate the descending order. The integer values maybe changed.

The method/device according to the embodiments may determine whether to generate a Morton code based on a threshold (axis_ordering_threshold) determined according to data characteristics.

The Morton code generation condition and application of a threshold may differ among sequences/tiles/slices. In this case, the values used may be defined as signaling information (see FIGS. 20 to 24).

A decoder corresponding to the encoder according to the embodiments may perform all the operations of the encoder in the same manner.

The Morton code generator 19000 according to the condition and the change of the order 19000 according to the threshold may be applied before or after geometry coding, or both before and after the geometry coding.

Figure 20:
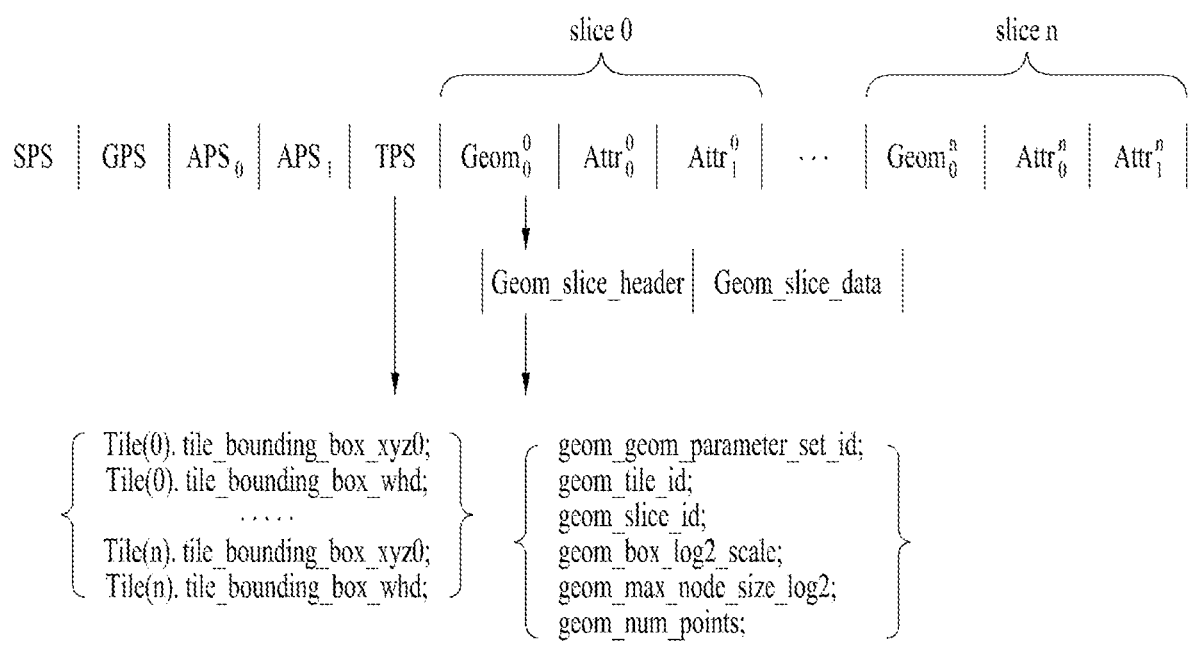
FIG. 20 shows a configuration of a point cloud bitstream according to embodiments.

FIG. 20 shows a configuration of a point cloud bitstream according to embodiments.

The method/device according to the embodiments may generate and obtain a point cloud bitstream as shown in FIG. 20. For example, a point cloud bitstream including parameters including geometry information, attribute information, and/or metadata for the same may be generated (encoded) and received (decoded) by the transmission device 10000, the point cloud video encoder 10002, the reception device 10004, the point cloud video decoder 10006 of FIG. 1, the encoding 20001, the decoding 20003 of FIG. 2, the encoding process of FIG. 4, the decoding process of FIG. 11, the transmission device of FIG. 12, the reception device of FIG. 13, the XR device 1430 of FIG. 14, the Morton code generator 19000 of FIG. 19, the methods according to the embodiments of FIGS. 25 and 26, and the like, respectively.

Information for embodiments may be signaled.

The following abbreviations are used in the present disclosure: SPS (Sequence Parameter Set); GPS (Geometry Parameter Set); APS (Attribute Parameter Set); TPS (Tile Parameter Set); Geom (Geometry bitstream (=geometry slice header+geometry slice data)); Attr (Attribute bitstream (=attribute brick header+attribute brick data)). Here, the brick may be referred to as a block, a slice, or the like.

The point cloud data according to the embodiments may take the form of a bitstream as shown in FIG. 20. The point cloud data may contain a sequence parameter set (SPS), a geometry parameter set (GPS), an attribute parameter set (APS), and a tile parameter set (TPS) containing signaling information according to embodiments. The point cloud data may contain one or more geometries and/or attributes. The geometry and/or attributes in the point cloud data may be divided into one or more slices (or bricks/blocks). The geometry may have a structure of a geometry slice header and geometry slice data. For example, the TPS containing signaling information may include Tile(0)_tile_bounding_box_xyz0 and Tile(0)_tile_bounding_box_whd. The geometry may include geom_geom_parameter_set_id, geom_tile_id, geom_slice_id, geomBoxOrigin, geom_box_log 2_scale, geom_max_node_size_log 2, and geom_num_points.

The signaling information according to the embodiments may be added to the SPS, GPS, APS, TPS, or the like and signaled.

According to embodiments, the signaling information may be added to the TPS, Geom for each slice, or Attr for each slice and signaled.

The structure of the point cloud data according to the embodiments may efficiently provide parameter set(s), geometry(s), and attribute(s) including signaling information in terms of encoding/decoding/data.

The point cloud data related to the point cloud data transmission/reception device according to the embodiments may contain at least one of a sequence parameter, a geometry parameter, an attribute parameter, a tile parameter, a geometry bitstream, or an attribute bitstream.

Hereinafter, syntax of specific signaling information will be described with reference to the drawings. For reference, the name of the signaling information according to the embodiments may be changed/extended within the intended meaning/function range of the signaling information. The field of signaling information may be distinguishably referred to as first signaling information, second signaling information, or the like.

As described above, the point cloud data transmission device (for example, the point cloud data transmission device described with reference to FIGS. 1, 11, 14 and 1) may transmit encoded point cloud data in the form of a bitstream. According to embodiments, the bitstream may include one or more sub-bitstreams.

The point cloud data transmission device (e.g., the point cloud data transmission device described in FIGS. 1, 4, 12 and 19) may divide an image of the point cloud data into one or more packets in consideration of the error of the transmission channel, and transmit the same over the network. According to embodiments, the bitstream may include one or more packets (e.g., network abstraction layer (NAL) units). Therefore, even when some packets are lost in a poor network environment, the point cloud data reception device may reconstruct the image using the remaining packets. The point cloud data may be partitioned into one or more slices or one or more tiles to be processed. The tiles and slices according to embodiments are regions for performing point cloud compression coding by partitioning a picture of the point cloud data. The point cloud data transmission device may provide high-quality point cloud content by processing data corresponding to each region according to the importance of each partitioned region of the point cloud data. That is, the point cloud data transmission device may perform point cloud compression coding with better compression efficiency and appropriate latency on data corresponding to a region important to a user.

An image (or picture) of point cloud content according to embodiments is partitioned into basic processing units for point cloud compression coding. The basic processing unit for point cloud compression coding according to the embodiments may include, but is not limited to, a coding tree unit (CTU) and a brick (=slice).

A slice according to embodiments is a region including basic processing units for one or more point cloud compression codings, and does not have a rectangular shape. The slice according to the embodiments contains data transmitted through a packet. A tile according to embodiments is a region partitioned in a rectangular shape in the image and includes basic processing units for one or more point cloud compression codings. One slice according to embodiments may be included in one or more tiles. Also, one tile according to embodiments may be included in one or more slices.

According to embodiments, a bitstream may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and one or more slices.

The SPS according to the embodiments may be encoding information for an entire sequence such as a profile and a level, and may include comprehensive information about the entire file, such as picture resolution and video format.

One slice according to embodiments (e.g., slice 0) contains a slice header and slice data. The slice data may include one geometry bitstream Geom00 and one or more attribute bitstreams Attr00 and Attr10. The geometry bitstream may contain a header (e.g. geometry slice header) and a payload (e.g. geometry slice data). The header of the geometry bitstream according to the embodiments may contain identification information (geom_geom_parameter_set_id) about a parameter set included in the GPS, a tile identifier (geom_tile id), slice identifier (geom_slice_id), origin information about a geometry box (geomBoxOrigin), a geometry box scale (geom_box_log 2_scale), a max geometry node size (geom_max_node_size_log 2), the number of geometry points (geom_num_poins), and information about data contained in the payload. The attribute bitstream may contain a header (e.g. an attribute slice header or an attribute brick header) and a payload (e.g., attribute slice data or attribute brick data).

Parameter information related to embodiments may be delivered in various regions (units) such as a sequence, geometry, an attribute, a tile, and a slice, and the reception method/device according to the embodiments may statically/dynamically access point cloud data.

Related information may be signaled to implement embodiments. Signaling information according to embodiments may be used at the transmitting side or the receiving side.

Geometry data (Geom): Geometry bitstream=geometry slice header+geometry slice data Attribute data (Attr): Attribute bitstream=attribute slice header+attribute slice data (attribute brick data).

The method/device according to the embodiments provides a tile or a slice such that the point cloud may be divided into regions and processed. When the point cloud is divided into regions, each region may have a different importance.

By providing regions such that different filters and different filter units may be applied according to the importance, a filtering method having high complexity but good result quality may be used in an important region.

In dividing the point cloud data into regions, an option of generating a different neighbor point set for each region may be set, such that low complexity is obtained although the reliability of the result is somewhat low, or that high reliability is obtained although the complexity is high. This may be set differently according to the processing capacity of the receiver.

By applying different filtering to the respective regions (regions partitioned into tiles or slices) according to the receiver capacity, rather than applying a complex filtering method to the entire point cloud data. Therefore, better image quality may be ensured in a region important to the user and an appropriate latency may be ensured in the system.

When the method/device according to the embodiments divides point cloud data into tiles, different filters or different filter units may be applied to the respective tiles.

When the method/device according to the embodiments divides point cloud data into slices, different filters or different filter units may be applied to the respective slices.

When the point cloud is divided into tiles, signaling information may be transmitted for each tile. When the point cloud is divided into slices, signaling information may be delivered for each slice.

The signaling information according to the embodiments may be selectively or redundantly included in various positions.

A sequence according to embodiments may have multiple tiles, a tile may have multiple slices, and a slice may include one octree. The SPS is at a sequence level, and the APS is also at the sequence level. The SPS contains more general information. The ASP contains more specific information in Attribute. In the TPS, when a sequence is divided into tiles, a different technique may be applied to each tile. When there is information configured in the APS and information configured in the TPS, the APS may be configured by default. When there is no configuration information in the TPS, a default may be used. When there is configuration information in the TPS, the reception method/device according to the embodiments may use the information of the TPS. In the attribute slice header, each tile may be divided into slices. That is, configuration information may be configured for each slice.

FIGS. 21 to 24 show detailed syntax of signaling information included in the bitstream of the point cloud data of FIG. 20. In order to support the operations according to the embodiments, the transmission/reception device according to the embodiments may provide a signaling scheme as follows. The name of the signaling information may be understood within the scope of the meaning and function of the signaling information.

Signaling information related to the condition and threshold information for a Morton code generation order according to embodiments may be transmitted in a bitstream. In order to perform operations related to the condition and threshold for a Morton code generation order, parameter information related to the condition for generation and the threshold may be signaled.

Hereinafter, signaling information of an encoder/decoder according to a Morton code generation order will be described based on parameter information according to embodiments.

A signaling operation may be added to the encoder/decoder according to the threshold of the condition for Morton code generation.

FIG. 21 shows a tile parameter set (TPS) according to embodiments.

FIG. 21 shows the TPS included in FIG. 20.

The transmission method/device according to the embodiments may add Morton code generation related information to the TPS and transmit the same, and the reception method/device according to the embodiments may acquire the Morton code generation related information based on the TPS.

axis_condition_selection indicates an axis condition selection method for Morton code generation. It may indicate axis-based condition/density-based condition/others condition. For example, 0 may indicate ordering according to an axis (S16000), 1 may indicate ordering according to density (S16010), and 2 may indicate use of other methods. The integer values may be changed.

ascending_order_flag indicates information on whether the order according to the condition indicated by axis_condition_selection is an ascending order or descending order, the sort order. For example, 0 may indicate that sorting is performed in ascending order, and 1 may indicate that sorting is performed in descending order. The integer values may be changed.

axis_ordering_threshold indicates information related to whether or not to perform Morton interleaving according to a condition by applying a threshold according to a determined condition determined in relation to the Morton code.

num_tiles specifies the number of tiles signaled for the bitstream. When not present, num_tiles may be inferred to be 0.

According to num_tiles, the following tile-related parameter information may be included in the TPS for each number of tiles.

tile_bounding_box_offset_x[i] indicates the x offset of the i-th tile in the Cartesian coordinates. When not present, the value of tile_bounding_box_offset_x[0] may be inferred to be sps_bounding_box_offset_x.

tile_bounding_box_offset_y[i] indicates the y offset of the i-th tile in the cartesian coordinates. When not present, the value of tile_bounding_box_offset_y[0] may be inferred to be sps_bounding_box_offset_y.

tile_bounding_box_offset_z[0] 의 값은 (tile_bounding_box_offset_z[i] indicates the z offset of the i-th tile in the Cartesian coordinates. When not present, the value of tile_bounding_box_offset_z[0] may be inferred to be sps_bounding_box_offset_z.

tile_bounding_box_scale_factor[i] indicates the scale factor the i-th tile in the Cartesian coordinates. When not present, the value of tile_bounding_box_scale_factor[0] may be inferred to be sps_bounding_box_scale_factor.

tile_bounding_box_size_width[i] indicates the width of the i-th tile in the Cartesian coordinates. When not present, the value of tile_bounding_box_size_width[0] may be inferred to be sps_bounding_box_size_width.

tile_bounding_box_size_height[i] indicates the height of the i-th tile in the Cartesian coordinates. When not present, the value of tile_bounding_box_size_height[0] may be inferred to be sps_bounding_box_size_height).

tile_bounding_box_size_depth[i] indicates the depth of the i-th tile in the Cartesian coordinates. When not present, the value of tile_bounding_box_size_depth[0] may be inferred to be sps_bounding_box_size_depth).

FIG. 22 shows a geometry parameter set (GPS) according to embodiments.

FIG. 22 shows the GPS included in FIG. 20.

The transmission method/device according to the embodiments may add Morton code generation related information to the GPS and transmit the same, and the reception method/device according to the embodiments may acquire the Morton code generation related information based on the GPS.

axis_condition_selection indicates an axis condition selection method for Morton code generation. It may indicate axis-based condition/density-based condition/others condition. For example, 0 may indicate ordering according to an axis (S16000), 1 may indicate ordering according to density (S16010), and 2 may indicate use of other methods. The integer values may be changed.

ascending_order_flag indicates information on whether the order according to the condition indicated by axis_condition_selection is an ascending order or descending order, the sort order. For example, 0 may indicate that sorting is performed in ascending order, and 1 may indicate that sorting is performed in descending order. The integer values may be changed.

axis_ordering_threshold indicates information related to whether or not to perform Morton interleaving according to a condition by applying a threshold according to a determined condition determined in relation to the Morton code.

gps_geom_parameter_set_id provides an identifier for the GPS for reference by other syntax elements. The value of gps_seq_parameter_set_id shall be in the range of 0 to 15, inclusive.

gps_seq_parameter_set_id specifies the value of sps_seq_parameter_set_id for the active SPS. The value of gps_seq_parameter_set_id shall be in the range of 0 to 15, inclusive.

geometry_coding_type indicates the coding type for the geometry for the given value of geometry_coding_type. The value of geometry_coding_type shall be equal to 0 or 1 in bitstreams conforming to this version of this Specification. Other values of geometry_coding_type are reserved for future use by ISO/IEC: 0=Octree; 1=Triangle Soup (Trisoup). Decoders conforming to this version of this Specification shall ignore reserved values of geometry_coding_type.

gps_box_present_flag equal to 1 specifies that additional bounding box information is provided in a geometry header that references the current GPS. gps_bounding_box_present_flag equal to 0 specifies that additional bounding box information is not signalled in the geometry header.

unique_geometry_points_flag equal to 1 indicates that all output points have unique positions. unique_geometry_points_flag equal to 0 indicates that the output points may have the same positions.

neighbour_context_restriction_flag equal to 0 indicates that octree occupancy coding uses contexts determined from six neighbouring parent nodes. neighbour_context_restriction_flag equal to 1 indicates that octree coding uses contexts determined from sibling nodes only.

inferred_direct_coding_mode_enabled_flag equal to 0 indicates that octree coding uses inferred_direct_coding_mode. inferred_direct_coding_mode_enabled_flag equal to 1 indicates that octree coding uses multiple context determined from sibling neighbouring nodes.

bitwise_occupancy_coding_flag equal to 1 indicates that geometry node occupancy is encoded using bit-wise contextualisation of the syntax element ocupancy_map. bitwise_occupancy_coding_flag equal to 0 indicates that geometry node occupancy is encoded using the dictionary encoded syntax element occypancy_byte.

child_neighbors_enabled_flag indicates whether the child neighbor node is enabled.

adjacent_child_contextualisation_enabled_flag equal to 1 indicates that the adjacent children of neighbouring octree nodes are used for bit-wise occupancy contextualization. adjacent_child_contextualization_enabled_flag equal to 0 indicates that the children of neighbouring octree nodes are not used for the occupancy contextualization.

geom_occupancy_ctx_reduction_factor indicates a reduction factor for occupancy.

log 2_neighbour_avail_boundary may specify the value of the variable NeighbAvailBoundary that is used in the decoding process as follows: NeighbAvailBoundary=2 log 2_neighbour_avail_boundary.

When neighbour_context_restriction_flag is equal to 1, NeighbAvailabilityMask (NeighbAvailBoundary) may be set equal to 13. neighbour_context_restriction_flag equal to 0, NeighbAvailabilityMask may be set equal to (1<<log 2_neighbour_avail_boundary).

log 2_intra_pred_max_node_size indicates the size of an octree node for occupancy intra prediction.

log 2_trisoup_node_size may specify the variable TrisoupNodeSize as the size of the triangle nodes as follows. TrisoupNodeSize=2 log 2_trisoup_node_size. The value of log 2_trisoup_node_size shall be equal to or greater than 0.

When log 2_trisoup_node_size is equal to 0, the geometry bitstream may include only the octree coding syntax.

trisoup_depth specifies the number of bits used to represent each component of a point coordinate. The value of trisoup_depth shall be in the range of 2 to 21. [Ed(df): 21 should perhaps be a level limit].

trisoup_triangle_level specifies the level at which the octree is pruned. The value of trisoup_triangle_level shall be in the range of 1 to trisoup_depth−1.

gps_extension_present_flag equal to 1 specifies that the gps_extension_data syntax structure is present in the GPS RBSP syntax structure. gps_extension_present_flag equal to 0 specifies that this syntax structure is not present. When not present, the value of gps_extension_present_flag is inferred to be equal to 0.

gps_extension_data_flag indicates whether extension data is present. gps_extension_data_flag may have any value. Its presence and value do not affect decoder conformance to profiles specified in Annex A. Decoders conforming to a profile specified in Annex A.

FIG. 23 shows an attribute parameter set (APS) according to embodiments.

FIG. 23 shows the APS included in FIG. 20.

The transmission method/device according to the embodiments may add Morton code generation related information to the APS and transmit the same, and the reception method/device according to the embodiments may acquire the Morton code generation related information based on the APS.

axis_condition_selection indicates an axis condition selection method for Morton code generation. It may indicate axis-based condition/density-based condition/others condition. For example, 0 may indicate ordering according to an axis (S16000), 1 may indicate ordering according to density (S16010), and 2 may indicate use of other methods. The integer values may be changed.

ascending_order_flag indicates information on whether the order according to the condition indicated by axis_condition_selection is an ascending order or descending order, the sort order. For example, 0 may indicate that sorting is performed in ascending order, and 1 may indicate that sorting is performed in descending order. The integer values may be changed.

axis_ordering_threshold indicates information related to whether or not to perform Morton interleaving according to a condition by applying a threshold according to a determined condition determined in relation to the Morton code.

aps_attr_parameter_set_id may provide an identifier for the APS for reference by other syntax elements. The value of aps_attr_parameter_set_id shall be in the range of 0 to 15, inclusive.

aps_seq_parameter_set_id may specify the value of sps_seq_parameter_set_id for the active SPS. The value of aps_seq_parameter_set_id shall be in the range of 0 to 15, inclusive.

attr_coding_type indicates that the coding type for the attribute in Table 7 2 for the given value of attr_coding_type. The value of attr_coding_type shall be equal to 0, 1, or 2 in bitstreams conforming to this version of this Specification: 0=Predicting weight lifting; 1=Region Adaptive Hierarchical Transform (RAHT); 2=Fixed weight lifting. Other values of attr_coding_type are reserved for future use by ISO/IEC. Decoders conforming to this version of this Specification shall ignore reserved values of attr_coding_type.

num_pred_nearest_neighbours specifies the maximum number of nearest neighbours to be used for prediction. The value of numberOfNearestNeighboursInPrediction shall be in the range of 1 to xx.

max_num_direct_predictors specifies the maximum number of predictor to be used for direct prediction. The value of max_num_direct_predictors shall be range of 0 to num_pred_nearest_neighbours. The value of the variable MaxNumPredictors that may be used in the decoding process as follows: MaxNumPredictors=max_num_direct_predicots+1.

lifting_search_range specifies a search range for the lifting.

lifting_quant_step_size specifies the quantization step size for the 1st component of the attribute. The value of quant_step_size shall be in the range of 1 to xx.

lifting_quant_step_size_chroma specifies the quantization step size for the chroma component of the attribute when the attribute is colour. The value of quant_step_size_chroma shall be in the range of 1 to xx.

lod_binary_tree_enabled_flag specifies whether the binary tree is enabled or not for the log generation.

num_detail_levels_minus1 specifies the number of levels of detail (LODs) for the attribute coding. The value of num_detail_levels_minus1 shall be in the range of 0 to xx.

sampling_distance_squared [idx] specifies the square of the sampling distance for idx. The value of sampling_distance_squared[ ] shall be in the range of 0 to xx.

adaptive_prediction_threshold specifies the threshold of prediction.

raht_depth specifies the number of levels of detail for RAHT. The value of depthRAHT shall be in the range of 1 to xx.

raht_binarylevel_threshold specifies the levels of detail to cut out the RAHT coefficient. The value of binaryLevelThresholdRAHT shall be in the range of 0 to xx.

raht_quant_step_size specifies the quantization step size for the 1st component of the attribute. The value of quant_step_size shall be in the range of 1 to xx.

aps_extension_present_flag equal to 1 specifies that the aps_extension_data syntax structure is present in the APS RBSP syntax structure. aps_extension_present_flag equal to 0 specifies that this syntax structure is not present. When not present, the value of aps_extension_present_flag may be inferred to be equal to 0.

aps_extension_data_flag indicates whether APS extension data is present. aps_extension_data_flag may have any value. Its presence and value do not affect decoder conformance to profiles specified in Annex A. Decoders conforming to a profile specified in Annex A.

FIG. 24 shows a geometry slice header (GSH) according to embodiments.

The transmission method/device according to the embodiments may add Morton code generation related information to the GSH and transmit the same, and the reception method/device according to the embodiments may acquire the Morton code generation related information based on the GSH.

axis_condition_selection indicates an axis condition selection method for Morton code generation. It may indicate axis-based condition/density-based condition/others condition. For example, 0 may indicate ordering according to an axis (S16000), 1 may indicate ordering according to density (S16010), and 2 may indicate use of other methods. The integer values may be changed.

ascending_order_flag indicates information on whether the order according to the condition indicated by axis_condition_selection is an ascending order or descending order, the sort order. For example, 0 may indicate that sorting is performed in ascending order, and 1 may indicate that sorting is performed in descending order. The integer values may be changed.

axis_ordering_threshold indicates information related to whether or not to perform Morton interleaving according to a condition by applying a threshold according to a determined condition determined in relation to the Morton code.

gsh_geometry_parameter_set_id specifies the value of the gps_geom_parameter_set_id of the active GPS.

gsh_tile_id specifies the id of a tile.

gsh_slice_id specifies the id of a slice.

According to the value of gps_box_present_flag, the following parameters related to the box in the GSH may be included in the GSH.

gsh_box_log 2_scale specifies a scale value. It indicates the scale factor of the origin of the slice bounding box. When not present, gsh_box_log 2_scale may be inferred to be gps_gs_box_log 2 scale.

gsh_box_origin_x specifies the x of the source bounding box in the Cartesian coordinates.

gsh_box_origin_y specifies the y of the source bounding box in the Cartesian coordinates.

gsh_box_origin_z specifies the z of the source bounding box in the Cartesian coordinates.

gsh_log 2_max_nodesize specifies the value of the variable MaxNodeSize that is used in the decoding process. MaxNodeSize may be equal to 2(gbh_log 2_max_nodesize).

gbh_points_number specifies the number of coded points in the slice.

Figure 25:
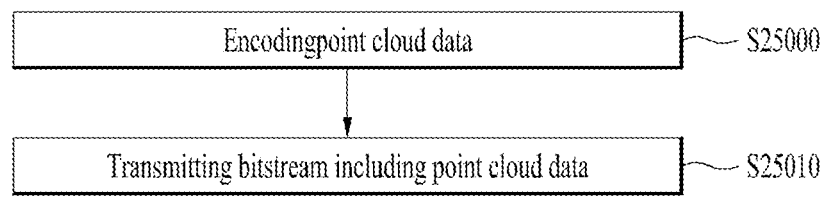
FIG. 25 illustrates a method for transmitting point cloud data according to embodiments.

FIG. 25 illustrates a method for transmitting point cloud data according to embodiments.

S25000: The method for transmitting point cloud data according to embodiments may include encoding point cloud data. The encoding operation may include the operations of the transmission device 10000, the point cloud video encoder 10002 of FIG. 1, the acquisition 20000, the encoding 20001 of FIG. 2, the encoding of a geometry bitstream from positions of FIG. 4, the encoding of an attribute bitstream from attributes of FIG. 4, the encoding of position values and/or attribute values of points by the transmission device of FIG. 12, the XR device 1430 of FIG. 14, the Morton code generation and the encoding of the point cloud data based on the Morton code according to FIGS. 15 to 19, and the generation of a bitstream of FIGS. 20 to 24.

S25010: The method for transmitting point cloud data may further include transmitting a bitstream including the point cloud data. The transmission operation may include the operations of the transmitter 10003 of FIG. 1, the transmission 20002 of FIG. 2, the transmission processor 12012 of FIG. 12, the XR device 1430 of FIG. 14, and the transmission of a bitstream of FIGS. 20 to 24.

Figure 26:
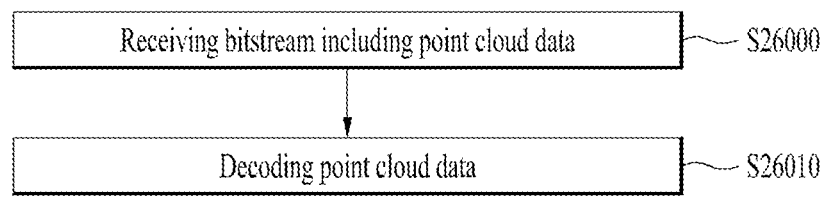
FIG. 26 illustrates a method for receiving point cloud data according to embodiments.

FIG. 26 illustrates a method for receiving point cloud data according to embodiments.

S26000: The method for receiving point cloud data according to the embodiments may include receiving a bitstream including point cloud data. The reception operation may include the operations of the reception device 10004 of FIG. 1, the reception according to the transmission 20002 of FIG. 2, the receiver 13000 and reception processor 13001 of FIG. 13, the reception by the XR device 1430 of FIG. 14, and the reception of the bitstream of FIGS. 20 to 24.

S26010: The method for receiving point cloud data may further include decoding the point cloud data. The decoding operation may include the operations of may include the point cloud video decoder 10006 of FIG. 1, the decoding 20003 of FIG. 2, the decoding of positions and/or attributes from the geometry bitstream and/or attribute bitstream of FIGS. 10 and 11, the decoding of the geometry bitstream and attribute bitstream and rendering of the point cloud data by the reception device of FIG. 13, decoding by the XR device 1430 of FIG. 14, Morton code generation and decoding of the point cloud data based on the Morton code according to FIGS. 15 to 19, and parsing/decoding of the bitstream of FIGS. 20 to 24.

The method/device according to the embodiments provides a method for generating an adaptive Morton code, a condition for changing a Morton code order, and operations related to a threshold therefor. In the operation of generating different Morton codes according to the condition, the condition includes conditions such as ascending order/descending order according to each axis/density. The condition may be applied differently according to the characteristics of content, each sequence/slice/tile, geometry, attributes, or both geometry and attributes.

The method/device according to the embodiments may improve image quality by reducing the size of a bitstream in searching for a neighbor node based on the distance/attributes. In addition, a Morton code may be generated through an order and a threshold according to the same condition in the encoding/decoding process through related signaling. Based on the Morton code, the encoder/transmission device may compress the point cloud data efficiently. Based on the Morton code, the decoder/reception device may reconstruct and render the point cloud data efficiently.

The point cloud data transmission/reception method/device and/or PCC encoder/decoder according to the embodiments may address the issue of the difference in Morton code occurring when the Euclidean distance between points of point cloud data is the same in space.

In addition, by changing the order of the xyz axes according to the axes, encoding and decoding may be performed according to each content unit, tile, slice, geometry value, or attribute value. Furthermore, axis transformation may be changed depending on a threshold. Accordingly, the embodiments may provide mapping conditions for adaptive Morton codes for searching for nearby neighbor nodes while perform adaptive spatial search in units of content, tile, slice, range, or attribute value.

The time and complexity of the compression of the point cloud according to the type of point cloud data and the PCC data encoding process, for example, the Morton code generation process may be reduced. In addition, a point cloud transmission/reception method/device that may improve compression performance may be provided.

The operations according to the embodiments may lower latency and increase accuracy of neighbor node search. In addition, the burden of the size of the bitstream including the point cloud data may be reduced.

The method/device according to the embodiments may change the order of bit interleaving of the Morton code by reflecting the characteristics of various point cloud data.

In this document, "A/B" is interpreted as A and/or B.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

MODE FOR DISCLOSURE

As described above, related contents have been described in the best mode for carrying out the embodiments.

INDUSTRIAL APPLICABILITY

As described above, the embodiments may be fully or partially applied to the point cloud data transmission/reception device and system.

It will be apparent to those skilled in the art that variously changes or modifications can be made to the embodiments within the scope of the embodiments.

Thus, it is intended that the embodiments cover the modifications and variations of this disclosure provided they come within the scope of the appended claims and their equivalents.

The invention claimed is:

1. A method comprising:
encoding geometry data of point cloud data based on a Morton code; and
encoding attribute data of the point cloud data, wherein the geometry data and the attribute data are included in a bitstream,
wherein the Morton code is generated based on changing an order of a x axis, a y axis, and a z axis for the point cloud data, and
wherein the bitstream includes information related to the changed order, and information for representing a threshold related to an ascending order based on an axis for the geometry data.

2. The method of claim 1, wherein
the Morton code is generated based on each of axes for the geometry data of the point cloud data, wherein a Morton order is generated based on a group size including a number of points of the point cloud data.

3. The method of claim 2, wherein the geometry data contains a coordinate value on each of the axes, wherein the Morton code is generated based on a binary bit of the coordinate value on each of the axes, and wherein the binary bits of the Morton code are sorted based on lengths of the axes.

4. The method of claim 1, wherein the Morton code is generated based on a density of the geometry data of the point cloud data.

5. The method of claim 4, wherein the geometry data contains a coordinate value on each of axes, wherein the Morton code is generated based on a binary bit of the coordinate value, and wherein the binary bits of the Morton code are sorted based on a density of one or more points with respect to each of the axes.

6. The method of claim 1, wherein the Morton code is generated based on a threshold related to distribution of one or more points of the point cloud data.

7. The method of claim 1, wherein the bitstream includes one or more parameters for signaling the point cloud data.

8. A device comprising:

a memory; and at least one processor connected to the memory, the at least one processor configured to:

encoding geometry data of point cloud data based on a Morton code; and encoding attribute data of the point cloud data, wherein the geometry data and the attribute data are included in a bitstream, wherein the Morton code is generated based on changing an order of a x axis, a y axis, and a z axis for the point cloud data, and wherein the bitstream includes information related to the changed order, and information for representing a threshold related to an ascending order based on an axis for the geometry data.

9. The device of claim 8, wherein the Morton code is generated based on each of axes for the geometry data of the point cloud data, wherein a Morton order is generated based on a group size including a number of points of the point cloud data.

10. The device of claim 9, wherein the geometry data contains a coordinate value on each of the axes, wherein the Morton code is generated based on a binary bit of the coordinate value on each of the axes, and wherein the binary bits of the Morton code are sorted based on lengths of the axes.

11. The device of claim 8, wherein the Morton code is generated based on a density of the geometry data of the point cloud data.

12. The device of claim 11, wherein the geometry data contains a coordinate value on each of axes, wherein the Morton code is generated based on a binary bit of the coordinate value, and wherein the binary bits of the Morton code are sorted based on a density of one or more points with respect to each of the axes.

13. The device of claim 8, wherein the Morton code is generated based on a threshold related to distribution of one or more points of the point cloud data.

14. The device of claim 8, wherein the bitstream includes one or more parameters for signaling the point cloud data.

15. A method comprising:

decoding geometry data of point cloud data in a bitstream based on a Morton code, and decoding attribute data of the point cloud data, wherein the Morton code is obtained based on changing an order of a x axis, a y axis and a z axis for the point cloud data, and wherein the bitstream includes information related to the changed order, and information for representing a threshold related to an ascending order based on an axis for geometry data of the point cloud data.

16. A device comprising:

a memory; and at least one processor connected to the memory, the at least one processor configured to:

receiving a bitstream including point cloud data; and decoding geometry data of the point cloud data based on a Morton code, wherein the Morton code is obtained based on changing an order of a x axis, a y axis and a z axis for the point cloud data, and wherein the bitstream includes information related to the changed order, and information for representing a threshold related to an ascending order based on an axis for geometry data of the point cloud data.

* * * * *